US007947773B2

(12) United States Patent
Hansen et al.

(10) Patent No.: US 7,947,773 B2
(45) Date of Patent: May 24, 2011

(54) ELECTRICALLY CONDUCTIVE COMPOSITE MATERIAL

(75) Inventors: George Clayton Hansen, Midway, UT (US); Lauren Hansen, Midway, UT (US); William C. Jenkin, Akron, OH (US)

(73) Assignee: Conductive Composites Company, L.L.C., Midway, UT (US)

( * ) Notice: Subject to any disclaimer, the term of this patent is extended or adjusted under 35 U.S.C. 154(b) by 179 days.

(21) Appl. No.: 11/609,113

(22) Filed: Dec. 11, 2006

(65) Prior Publication Data

US 2009/0117269 A1 May 7, 2009

Related U.S. Application Data

(62) Division of application No. 10/414,266, filed on Apr. 15, 2003, now Pat. No. 7,935,415.

(60) Provisional application No. 60/373,363, filed on Apr. 17, 2002, provisional application No. 60/412,662, filed on Sep. 20, 2002.

(51) Int. Cl.
*B29C 70/10* (2006.01)
*C08K 3/08* (2006.01)
*G01R 27/08* (2006.01)

(52) U.S. Cl. ........ 524/434; 524/435; 264/104; 977/754; 977/778; 73/862.625; 73/862.627

(58) Field of Classification Search .................. 264/104, 264/108, 109, 119, 637, 660; 524/434, 435; 977/754, 778; 427/220; 73/862.627
See application file for complete search history.

(56) References Cited

U.S. PATENT DOCUMENTS

| 3,570,829 | A | | 3/1971 | Schladitz |
| 3,955,962 | A | * | 5/1976 | Dawihl et al. ................... 75/347 |
| 3,996,167 | A | | 12/1976 | Brown |
| 4,566,990 | A | | 1/1986 | Liu et al. |
| 4,664,309 | A | | 5/1987 | Allen et al. |
| 4,718,824 | A | * | 1/1988 | Cholet et al. ................... 417/14 |
| 5,096,761 | A | | 3/1992 | Roberts et al. |

(Continued)

FOREIGN PATENT DOCUMENTS

EP   0 629 549 A2   12/1994

OTHER PUBLICATIONS

"Sumitomo Electric Develops Metal Nano-Powder for Electronic Devices." SEI NEWS webpage, Dec. 2001. 2 pages.

*Primary Examiner* — Kat Wyrozebski
*Assistant Examiner* — Scott W Dodds
(74) *Attorney, Agent, or Firm* — Madson IP, P.C.

(57) ABSTRACT

An electrically conductive composite material includes metallic nanostrands distributed throughout a matrix constructed of a polymer, ceramic, or elastomer. The nanostrands may have an average diameter under four microns and an average aspect ratio over ten-to-one. Larger fibers may also be included to enhance electrical conductivity or other properties. The nanostrands and/or fibers may be magnetically oriented to enhance electrical conductivity along one direction. A pressure sensor may be formed by utilizing an elastomer for the matrix. Electrical conductivity through the composite material varies in proportion to deflection of the elastomer. A composite material may be applied to a surface as an electrically conductive paint. Composite materials may be made by cutting a blank of the nanostrands to the desired shape, inserting the matrix, and curing the matrix. Alternatively, a suspension agent may first be used to dispose powdered nanostrands in the desired shape.

24 Claims, 16 Drawing Sheets

Nickel 500-nanometer branching nanostrands, enlarged 2,500 times

U.S. PATENT DOCUMENTS

| | | | |
|---|---|---|---|
| 5,130,204 A * | 7/1992 | Jenkin | 428/605 |
| 5,430,085 A * | 7/1995 | Acevedo et al. | 524/495 |
| 5,762,841 A * | 6/1998 | Shimai et al. | 264/44 |
| 5,785,913 A * | 7/1998 | Clark et al. | 264/109 |
| 5,830,548 A | 11/1998 | Andersen et al. | |
| 5,853,675 A | 12/1998 | Howorth | |
| 6,210,789 B1 * | 4/2001 | Hanrahan | 428/324 |
| 6,251,978 B1 * | 6/2001 | McCullough | 524/404 |
| 6,284,817 B1 * | 9/2001 | Cross et al. | 523/220 |
| 6,344,271 B1 * | 2/2002 | Yadav et al. | 428/402 |
| 6,375,703 B1 | 4/2002 | Chou et al. | |
| 6,528,572 B1 | 3/2003 | Patel et al. | |
| 6,617,377 B2 | 9/2003 | Chacko | |
| 6,646,540 B1 | 11/2003 | Lussey | |
| 6,680,016 B2 | 1/2004 | Wang et al. | |
| 6,835,331 B2 | 12/2004 | Fujiki et al. | |
| 6,866,799 B2 | 3/2005 | Orsbon et al. | |
| 6,936,191 B2 | 8/2005 | Fox et al. | |
| 7,147,966 B2 | 12/2006 | Ren et al. | |
| 7,217,754 B2 | 5/2007 | Koloski et al. | |
| 7,282,260 B2 | 10/2007 | LeGrande et al. | |
| 7,399,532 B2 | 7/2008 | Seido et al. | |

* cited by examiner

Nickel 1000-nanometer branching nanostrands, enlarged 2,500 times

Nickel 1000-nanometer branching nanostrands of FIG. 1, enlarged 10,000 times

Nickel 500-nanometer branching nanostrands, enlarged 2,500 times

Nickel 500-nanometer branching nanostrands of FIG. 2, enlarged 10,000 times

Nickel 100-nanometer branching nanostrands, enlarged 2,500 times

Nickel 100-nanometer branching nanostrands of FIG. 3, enlarged 10,000 times

Nickel 70-nanometer branching nanostrands, enlarged 40,000 times

Relationship between diameter and aspect ratio value (ARV) in nickel nanostrands 5% by weight nickel 1000-nanometer branching nanostrands disbursed with minimal shear mixing in epoxy resin matrix, enlarged 1,000 times 5% by weight nickel 500-nanometer branching nanostrands disbursed with minimal shear mixing in epoxy resin matrix, enlarged 1,000 times 5% by weight nickel 100-nanometer branching nanostrands disbursed with minimal shear mixing in epoxy resin matrix, enlarged 1,000 times

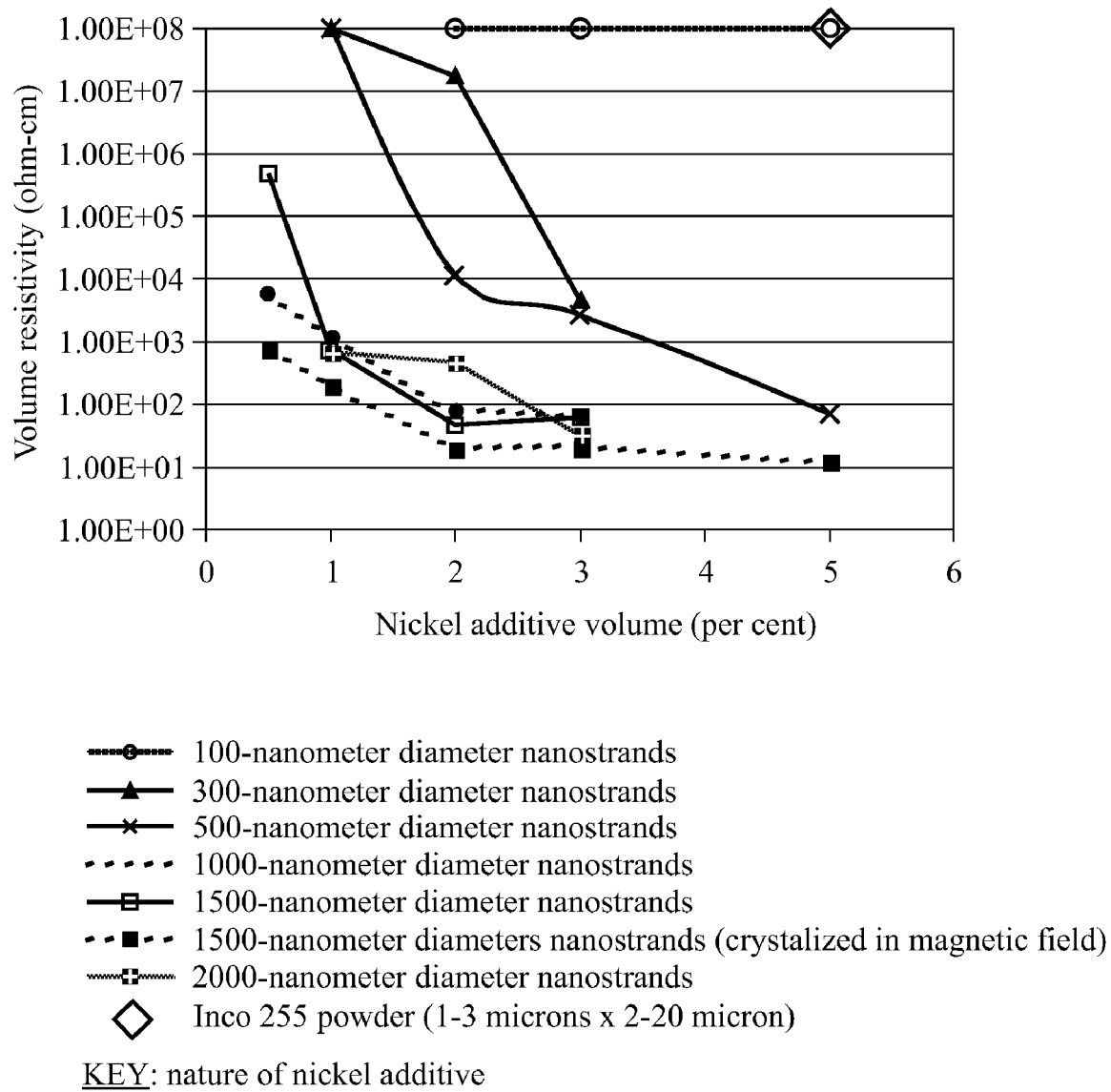

- ──⊙── 100-nanometer diameter nanostrands
- ──▲── 300-nanometer diameter nanostrands
- ──✕── 500-nanometer diameter nanostrands
- - - - - 1000-nanometer diameter nanostrands
- ──☐── 1500-nanometer diameter nanostrands
- - -■- - 1500-nanometer diameters nanostrands (crystalized in magnetic field)
- ⋯⋯⋯ 2000-nanometer diameter nanostrands
- ◇ Inco 255 powder (1-3 microns x 2-20 micron)

KEY: nature of nickel additive

Volume resistivity of 0.03-inch thick adhesive film of nickel additives disbursed with minimal shear mixing in an epoxy resin matrix

FIG. 9

Volume resistivity of a 0.03-inch thick layer of electrically-conductive additives distribted with minimal shear mixing in a quick-set epoxy resin matrix Volume resistivity of bars of nickel additives distributed with minimal shear mixing in an epoxy resin matrix

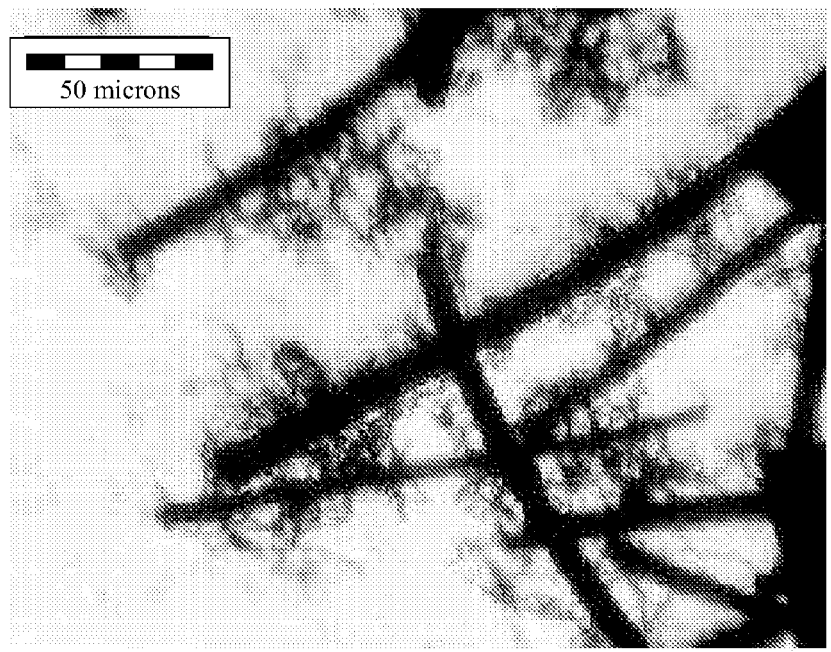

Hybrid electrically-conductive composite of chopped carbon fibers and nickel branching nanostrands distributed with minimal shear mixing in an epoxy resin matrix.

FIG. 12

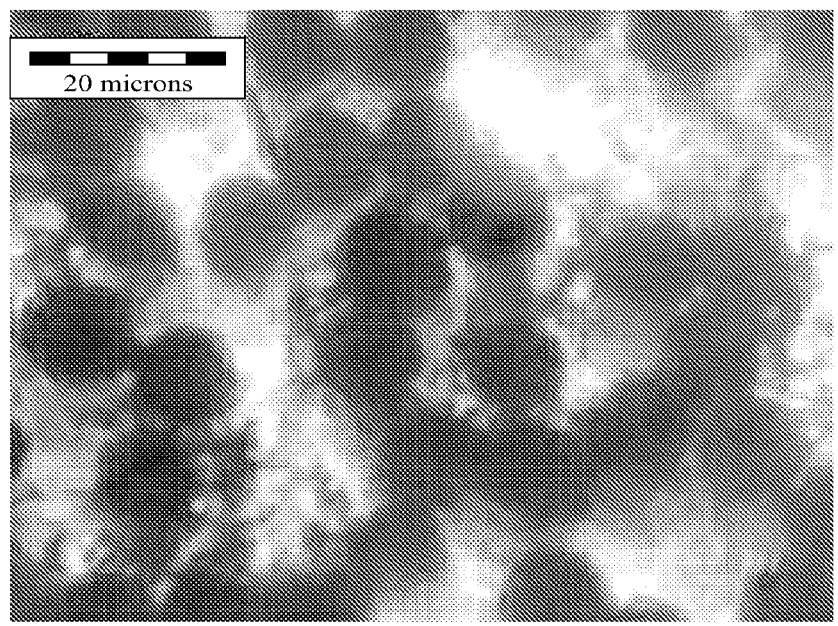

Polished cross section of hybrid electrically-conductive composite of continuous carbon fibers and nickel branching nanostrands distributed with minimal shear mixing in an epoxy resin matrix.

FIG. 13

Film of nickel branching nanostrands distributed with minimal shear mixing in an epoxy resin matrix and aligned magnetically prior to curing.

ELECTRICALLY CONDUCTIVE COMPOSITE MATERIAL

RELATED APPLICATIONS

This application is a divisional of U.S. patent application Ser. No. 10/414,266, filed Apr. 15, 2003, and now issued as U.S. Pat. No. 7,935,415, which is related to and claims the benefit of U.S. Provisional Application No. 60/373,363 filed Apr. 17, 2002 and entitled METAL NANOSTRAND MATERIAL and U.S. Provisional Application No. 60/412,662 filed Sep. 20, 2002 and entitled NICKEL NANOSTRANDS, both of which are incorporated herein by reference.

BACKGROUND OF THE INVENTION

1. Field of the Invention

The present invention relates to polymer, elastomer, or ceramic materials or composite materials employing polymers, elastomers, or ceramics as their matrix. More specifically, the present invention relates to the use of metallic nanostrands to form polymers, elastomers, ceramics, or composite materials with enhanced electrical conductivity.

2. Description of Related Art

Polymeric materials, either alone or reinforced with powders or fibers, are an attractive engineering material with respect to cost, weight, manufacturability and many other advantages. However, with the exception of some intrinsically conducting polymers, polymers generally possess poor electrical conductivity.

There are many conventional methods by which conductivity may be introduced into a polymer or composite system. One method is by coating the polymer with a conductive metal coating. A second method is the introduction of conductive additives such as metal or metal-coated powders or fibers into the polymer. Conventional additives include powders of metals such as silver, copper, nickel, iron and carbon, or fibers made of or coated with such metals. Another method is the creation of a conductive paint coating by adding metal powders or flakes to a paint, after which the paint may be used as a conductive coating.

In the case of composite materials, the reinforcing fibers may already be intrinsically conductive, such as is the case of carbon or metal-coated fibers. However, in the case of such composites, the conductivity is limited to the direction of the fibers. The adhesive polymer matrix of the composite insulates the fibers and greatly inhibits current flow in directions nonparallel to the fibers.

The poor electrical conductivity of such composite materials limits their usefulness in applications such as electromagnetic shielding, circuits, antennas, and the like. Furthermore, there are many applications in which known polymer-based composites may not be suitable because they do not sufficiently possess properties such as mechanical strength, thermal insulation, stiffness, and hardness. Known polymer-based composites may not be well suited to applications in which large, constant and/or repeated deflections occur, or applications in which deflection is to be measured.

Moreover, there are many applications in which it is desirable to coat an object with a conductive coating. It would be advantageous to enhance the electrical conductivity of such coatings for potential high-current applications such as electromagnetic shielding. Yet further, many applications require the use of objects with relatively complex shapes. Such complex shapes can be difficult or impossible to form from composite materials having the desired electrical conductivity.

Accordingly, it would be an advancement in the art to provide composite materials having increased thermal conductivity in comparison with the prior art. Furthermore, it would be an advancement in the art to provide conductive composite materials having a variety of additional characteristics such as mechanical strength, thermal insulation, stiffness, and hardness. Additionally, it would be an advancement in the art to provide conductive composite materials suitable for large deflection applications, and especially for deflection measurement. It would also be an advancement in the art to provide composite materials capable of being applied as highly conductive coatings. Yet further, it would be an advancement in the art to provide methods by which relatively complex, conductive composite shapes may be relatively easily and inexpensively manufactured.

SUMMARY OF THE INVENTION

The apparatus of the present invention has been developed in response to the present state of the art, and in particular, in response to the problems and needs in the art that have not yet been fully solved by currently available conductive materials. Thus, it is an overall objective of the present invention to provide conductive composite materials and associated manufacturing methods that remedy the shortcomings of the prior art.

U.S. Pat. No. 5,130,204 to Jenkin (hereinafter "the Jenkin Patent"), which is incorporated herein by reference, discloses a method of manufacturing what are therein referred to as "metal fibers" and mentions the combination of such "metal fibers" with a polymer to create an electrically-conductive composite material.

The present invention includes teachings about how to successfully produce an electrically-conductive composite material by dispersing "metal fibers" like those of the Jenkins Patent as an electrically-conductive additive throughout polymers and ceramics, both singularly and as a co-additive, while preserving specific properties of the additive that, according to further teachings of the present invention, correspondingly enable de minimus loadings of the additive to afford high degrees of electrical conductivity to composite materials. New electrically-conductive composite materials result that are nanostructured. Some initial applications for those new composite materials are disclosed.

To achieve the foregoing objective, and in accordance with the invention as embodied and broadly described herein in one embodiment, a composite material may have a matrix formed of a nonmetallic material, which may comprise a polymer, a ceramic, an elastomer, or any combination thereof. Metallic nanostrands are distributed throughout the matrix. The metallic nanostrands may have an average diameter under about four microns and an average aspect ratio (length-to-diameter ratio) of about ten-to-one or greater. The metallic nanostrands may be constructed of a metal such as nickel or iron. The nanostrands may also provide additional mechanical strength and/or thermal conductivity.

The metallic nanostrands may have a random orientation so that the electrical conductivity of the composite material is substantially the same in all directions. The metallic nanostrands cross each other to provide many current pathways. If desired, nanostrands with a comparatively high degree of branching may be used to enhance the electrical conductivity of the composite material.

According to one exemplary manufacturing method, such a composite material may be formed by mixing the nanostrands, in powder form, into a resin or other flowable or powdered form of the matrix. The resin or other flowable or powdered material may then be allowed to cure or set or cool (as in thermoplastics) to form the composite material. Depending on the type of material used to form the matrix, baking or other steps may additionally or alternatively be applied to obtain the composite material.

According to one alternative embodiment, fibers constructed of an electrically conductive material may be added to the matrix and the nanostrands of the previously described composite material. The fibers may be formed of carbon, nickel-coated carbon, or the like. The fibers may be chopped fibers or continuous fibers, depending on the type of composite to be produced.

The fibers cooperate with the nanostrands to synergistically enhance the electrical conductivity of the resulting composite material. Thus, a lower concentration of the nanostrands and fibers, combined, may be required to obtain a given level of electrical conductivity than would be required using just the fibers or the nanostrands, alone. The fibers may also or alternatively be selected to independently provide additional properties, such as mechanical strength, stiffness, thermal conductivity, and the like. Thus, design of the composite material for electrical conductivity may optionally be decoupled from design for such other properties.

According to another alternative embodiment, a composite material may be formed by exposing either of the previously described composite materials to magnetic flux. For example, the composite material of the immediately preceding embodiment may be disposed adjacent to a permanent magnet or an electromagnet in such a manner that magnetic flux passes through the composite material in a longitudinal direction. The magnetic flux operates to orient the nanostrands and the fibers in a direction generally parallel to the flux.

The magnetic flux may be applied prior to curing or other hardening of the matrix material, if desired. After magnetic orientation of the fibers and nanostrands, the matrix may be cured to fix the nanostrands and fibers in a substantially parallel orientation. The result is the enhancement of electrical conductivity in the direction of the magnetic flux.

According to another embodiment, the nanostrands may be included, with or without the fibers, in a matrix formed of an elastomeric material. It has been discovered that, when disposed in an elastomer, the nanostrands tend to provide an electrical conductivity that increases in proportion to tensile or compressive strain. Thus, the deformation of the resulting composite material may easily be measured by using an electric circuit with a voltage source and a current sensor or the like to measure the electrical conductivity of the composite material. Such a composite material may be disposed in a pressure sensor, accelerometer, or the like.

If desired, the matrix may be a material with a high coefficient of thermal expansion. A high coefficient of thermal expansion may facilitate use of the composite material to measure temperature by measuring the deformation of the composite material in the manner indicated above.

According to another alternative embodiment, an electrically conductive mixture may be formed by mixing metallic nanostrands (with or without chopped fibers) with a matrix that can be applied to a surface in a relatively flowable form. The matrix may be a polymer such as those typically used for paints. The electrically conductive mixture may then be applied to a surface of a body. The mixture may be applied mechanically, for example, through the use of a brush, roller or sprayer.

The electrically conductive mixture may then be permitted to dry or cure. The surface of the body is thus made conductive. If desired, the entire body may be coated with the electrically conductive mixture in a similar manner, so that the body behaves electrically in a manner similar to that of a solid conductor.

According to one method of manufacture, a composite material may be made by, first, forming a porous sponge (i.e., a brick or other standard shaped porous mesh) of the metallic nanostrands as the nanostrands are manufactured. The porous sponge may be called a "blank." A portion of the blank may then be mechanically cut, laser cut, compressed or otherwise removed or deformed to provide a nanostrand preform having a desired shape. Such performs are typically over 95% porous, and uniquely often over 99% porous. The matrix material is then inserted into the preform, for example, in the viscous phase, monomer phase or vapor phase. The matrix material may then be cured, set, or cooled to solidify the matrix with the nanostrands embedded therein. The resulting piece composite material has the desired shape, which may be directly adapted or further shaped to suit a particular application.

According to another method of manufacture, the nanostrands may first be formed as a powder, for example, by manufacturing a porous sponge of nanostrands and then breaking up the sponge to provide the powder. A suspension agent in a liquid mixture is then directed into the nanostrands. The suspended powdered nanostrands may then be disposed in the desired shape, for example, by inserting them into a mold. The suspension agent causes the nanostrands to adhere to one another, while the large length and small diameter of the self supporting nanostrands causes the material to remain highly porous. The bulk of the suspension agent is subsequently removed via evaporation, solvation, or the like, but a small surface quantity remains, so that the nanostrands adhere to each other and are porous like the preform described in connection with the previous method.

The matrix material is then directed into the nanostrands in a manner similar to that described previously. The matrix material is cured, set, or cooled to form the composite material with the desired shape. This method may be used to enable composite materials to be manufactured from powdered nanostrands efficiently shipped in bulk.

Through the use of the conductive composite materials and methods of the present invention, conductive polymers, elastomers, ceramics, or composite materials having enhanced electrical conduction and/or other properties may be made. Such composite materials may be easily formed in a wide variety of shapes. These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 9 is a graph presenting experimental data obtained from 0.03-inch thick adhesive films produced by distributing different nickel additives with minimal shear mixing in an epoxy resin matrix, the graph of FIG. 9 relating volume resistivity of the films to the volume concentrations of the nickel additive distributed therein;

FIG. 12 is a microphotograph of a hybrid electrically-conductive composite made of chopped carbon fibers and nickel branching nanostrands distributed with minimal shear mixing in an epoxy resin matrix;

FIG. 13 is a microphotograph of a polished cross section of a hybrid electrically-conductive composite made of continuous carbon fibers and nickel branching nanostrands distributed with minimal shear mixing in an epoxy resin matrix;

DETAILED DESCRIPTION OF THE PREFERRED EMBODIMENTS

Figure 1:
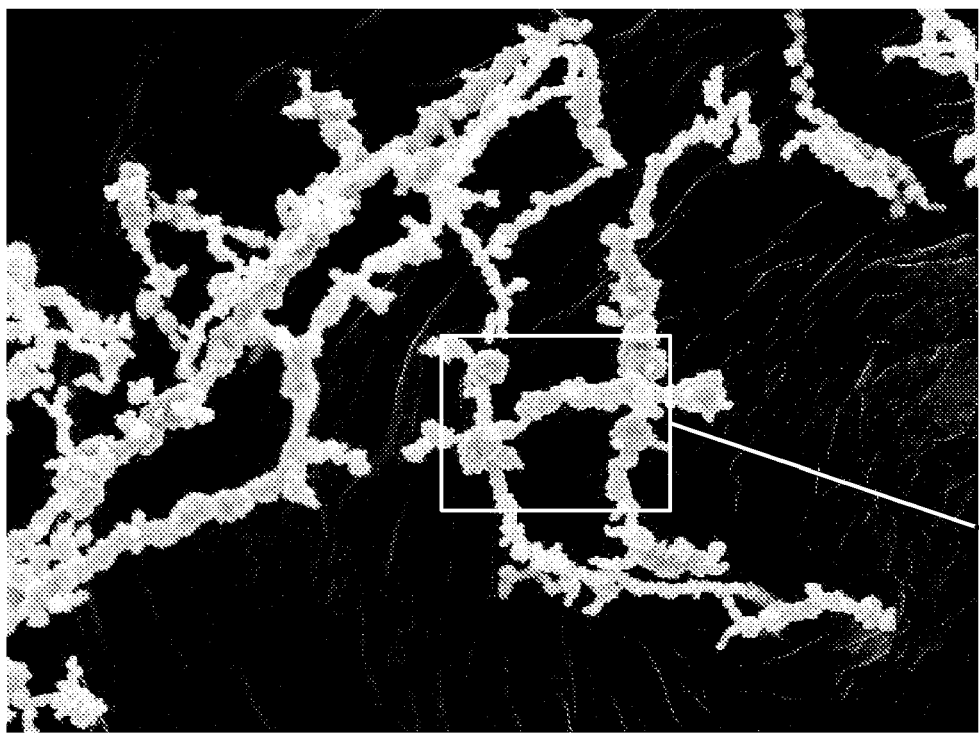
FIG. 1 is a microphotograph of free nickel branching nanostrands averaging about 1000 nanometers in diameter and enlarged 2,500 times.

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1-21, is not intended to limit the scope of the invention, as claimed, but is merely representative of presently preferred embodiments of the invention.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects.

The present invention pertains to the development of new materials, and in particular to the emerging field of new materials that are structured internally at dimensions so small as necessarily to be measured, not in microns, which are each a one millionth of a meter in length, but in the one thousand times smaller units of nanometers, which are each only a one billionths of a meter in length. New materials of this type are referred to as being "nanostructured", and it is toward the development of new nanostructured, electrically-conductive materials that the present invention is directed.

In the new, nanostructured, electrically-conductive materials disclosed herein, a nearly de minimus quantity of a nanostructured form of a metal, such as nickel, iron, cobalt, chromium, or a combination thereof, serving as an electrically-conductive additive alone in resins and jointly with other additives in composite systems, is sufficient to produce in those resins and composite systems degrees of electrical conductivity that surpass the electrical conductivity produced using other additives, particularly at comparable by-weight or by-volume concentrations. The electrically-conductive materials made available through the teachings of the present invention find utility, first, in the suppression of electrostatic discharge on objects fabricated from common or exotic polymers, paints, plastics, resins, composites, or textiles, and second, in the shielding of electronic devices from electromagnetic and radio-frequency interference.

Nickel is an effective additive for imparting electrical conductivity to non-electrically conductive materials, such as plastics, composites, and paints. Nickel is the most common metallic additive used to enhance electrical conductivity, being second in overall usage for that purpose only to carbon, which without the addition of more electrically-conductive metal materials is not itself impressively electrically conductive when compared with most metals. Though not as electrically conductive as silver, copper, or aluminum, nickel combines properties of electrical conductivity, reflectivity, magnetic reactivity, chemical inertness, and economy that render nickel the metallic element receiving of the closest scrutiny in the disclosure that follows. Promisingly, nickel is also formable into a wide variety of morphologies, such as into thin coatings on fibers or powders and into a variety of pure metallic powders. Other metals can be used in place of nickel in various of such roles and to differing advantage, respectively.

The admirable formability of nickel into a variety of morphologies arises from the ability of nickel to be deposited from a vapor phase through a chemical vapor deposition from its carbonyl. Many of the nickel powders commercially available as fillers for paints and resins are refined from the carbonyl process, which allows for good control of the size, the geometry, and the aspect ratio value (hereinafter occasionally "the ARV") of the particles produced. Nickel powders are thus available in diameters ranging from tenths of a micron to several microns. Some as small in diameter as from about 80 nanometers to about 150 nanometers are even available. A variety of nickel powders are produced by Inco Limited. Type 255 Inco nickel powder is about 1 micron to about 3 microns in diameter and about 2 microns to about 20 microns in length. Type 210 Inco nickel powder is about 0.25 microns to about 0.50 microns in diameter and about 1 micron to about 10 microns in length.

Still, the use of nickel powders as an electrically-conductive additive is constrained by the relatively high density of nickel when configured in powder forms. In addition, nickel powders exhibit relatively low aspect ratio values, ranging from a spherical ARV of 1:1 to an ARV of only about 10:1 at the maximum.

As an alternative, combination structures of carbon and nickel find utility as electrically-conductive additives. Carbon powders are coated with nickel to overcome the high density of solid nickel powders, while chopped nickel-coated carbon fibers exhibit higher aspect ratio values than do powder forms of nickel. To leverage greater aspect ratio values, carbon nanofibers are coated with nickel, and carbon nanotubes enclose or are coated by metals, such as nickel. Yet, carbon nanotubes achieve lengths only in a range from about a fraction of a micron to a few microns, and carbon nanotubes are relatively costly to produce.

As the science of new materials evolves to encompass nanostructured composites, smaller electrically-conductive additives that exhibit greater aspect ratio values are employed. One promising characteristic of the thermal decomposition of nickel from nickel carbonyl is the ability under correct conditions to create very long, high ARV materials of sub-micron diameter. These are referred to as nanostrands of nickel.

Nickel nanostrands are created in the thermal decomposition of nickel carbonyl in the absence of a deposition substrate according to the following reaction:

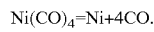

This reaction, known as the Mond process, was discovered by Ludwig Mond in 1888 and is used to produce a variety of nickel products, including highly-refined bulk nickel, nickel powders, nickel foams, nickel coatings on non-nickel fibers and powders, and nickel molds. In conditions of the types described in the Jenkin Patent, nickel decomposes into extremely small-diameter, but very lengthy, nanostrands of pure metallic nickel.

Several samples of nickel nanostrands are pictured in the accompanying microphotographs and will be introduced as selected physical characteristics of nickel nanostrands are addressed below. In terms of those physical characteristics, production conditions will be identified that, according to teachings of the present invention, result in nickel nanostrands that are advantageously well-suited to functioning as electrically-conductive additives in new nanostructured composite materials.

Diameter: The smallest nickel nanostrands have average diameters in a range centered about 100 nanometers, while larger nickel nanostrands have average diameters in a range centered about 3,000 nanometers (i.e. about 3 microns). Any average diameter is actually little more than a simplifying estimate. Generally, there is a wide range of diameters exhibited by the nickel nanostrands in any given batch thereof. Batches of nanostrands have been characterized having average diameters of 100 nanometers, 300 nanometers, 500 nanometers, 1,000 nanometers, 1,500 nanometers, 2,000 nanometers, and 3,000 nanometers.

Figure 1A:
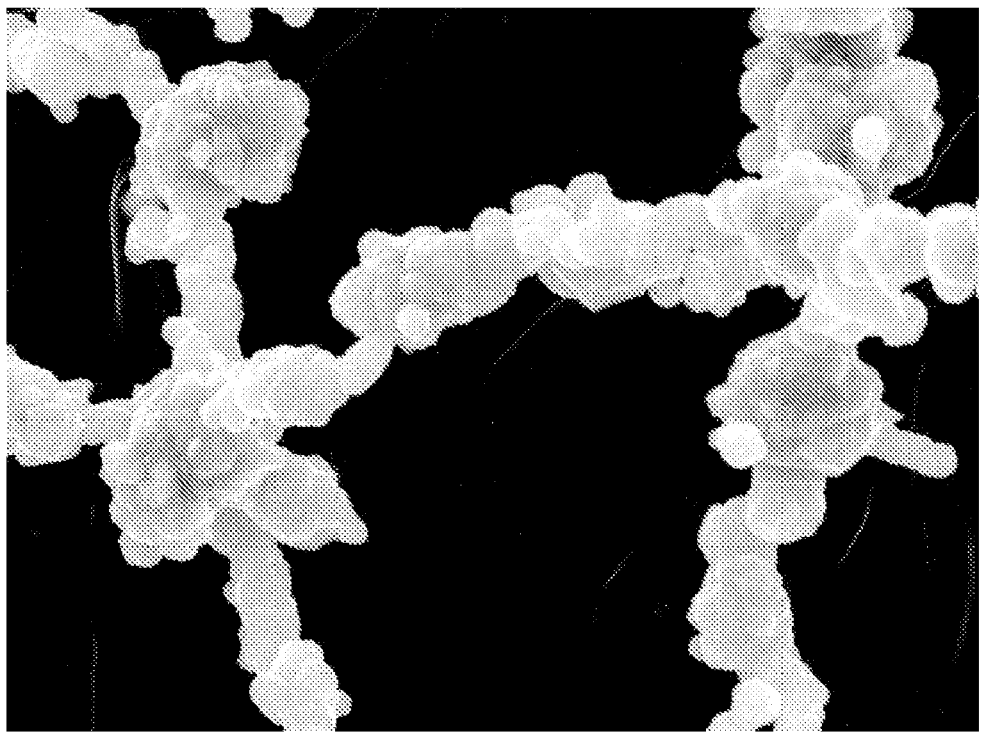
FIG. 1A is a microphotograph of the free nickel branching nanostrands of FIG. 1 enlarged 10,000 times.

FIG. 1 is a microphotograph of a batch of free nickel nanostrands that have been enlarged about 2,500 times. The nanostrands of FIG. 1 have average diameters in a range of from about 500 nanometers to about 1,000 nanometers, which for ease of reference will be characterized as being about 1,000 nanometers in diameter The nickel branching nanostrands depicted range in length from about 50 microns to about 100 microns. Associated therewith is the portion of FIG. 1 that is enclosed in a white rectangle, which has been enlarged four times and included as FIG. 1A. Strikingly, the nickel nanostrands of FIGS. 1 and 1A are not solitary or linear, but rather exhibit architectures characterized by complex and irregular branchings and interconnections. As will be borne out by subsequent microphotographs, this characteristic architecture is typical throughout all sizes of nickel nanostrands. Consequently, metallic nanostrands employed according to teachings of the present invention as electrically-conductive additives in resins, alone and in composite systems, should be understood to be nanostrands that consistently display complex and irregular branchings. It is the nature of nickel nanostrands to assume the form of branching nanostrands. Also to be noted from FIGS. 1 and 1A is that nickel branching nanostrands are bi-modal, having large-diameter main strands and a significant number of small-diameter branch strands that emerge generally laterally therefrom.

Figure 2:
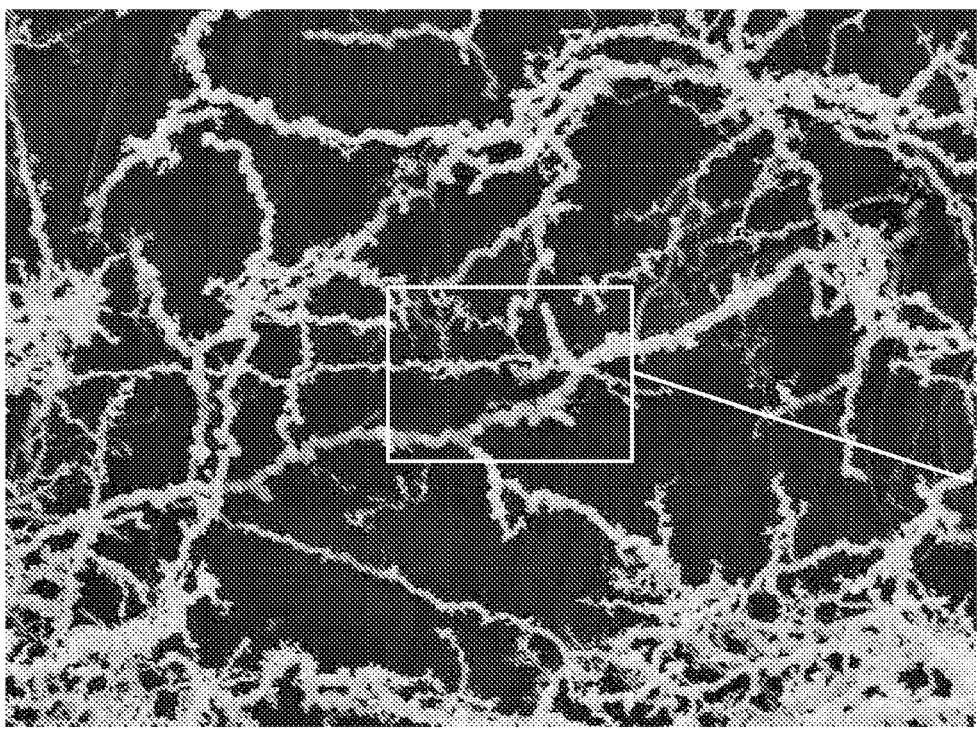
FIG. 2 is a microphotograph of free nickel branching nanostrands averaging about 500 nanometers in diameter and enlarged 2,500 times.
Figure 2A:
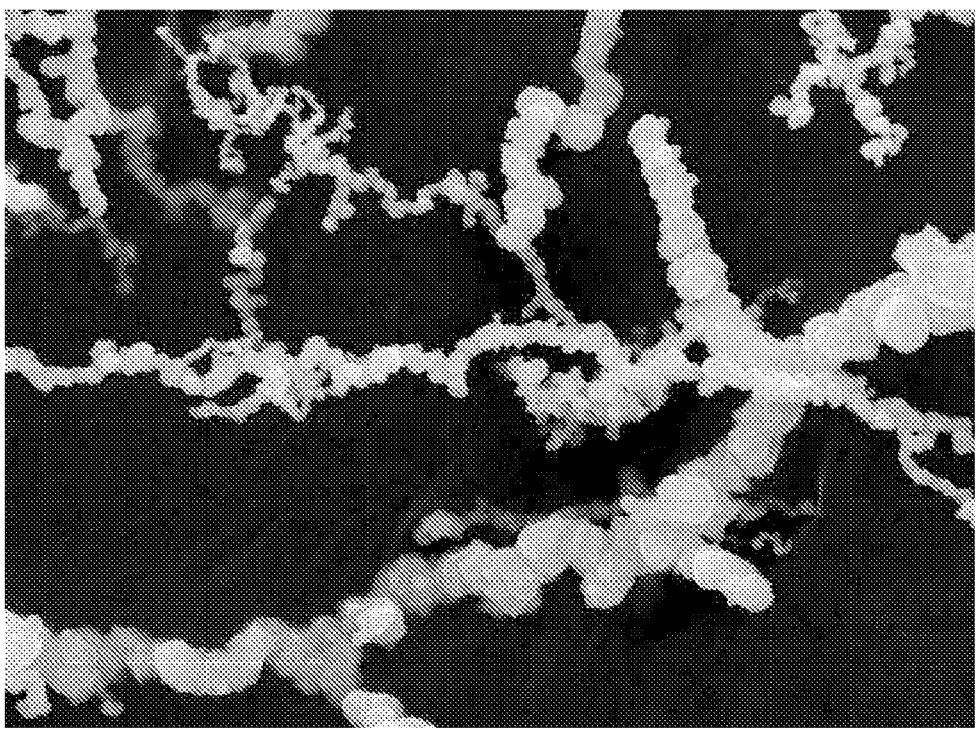
FIG. 2A is a microphotograph of the free nickel branching nanostrands of FIG. 2 enlarged 10,000 times.

These properties of nickel branching nanostrands may also be observed in FIGS. 2 and 2A, which are microphotographs of a batch of free nickel branching nanostrands enlarged, respectively, about 2,500 times and about 10,000 times. The nickel branching nanostrands of FIGS. 2 and 2A have average diameters in a range of from about 200 nanometers to about 500 nanometers, which for ease of reference will be characterized as being about 500 nanometers in diameter. The nickel branching nanostrands depicted range in length from about 20 microns to about 50 microns. A white rectangle in FIG. 2 encloses the portion thereof that has been enlarged and presented in FIG. 2A.

Figure 3:
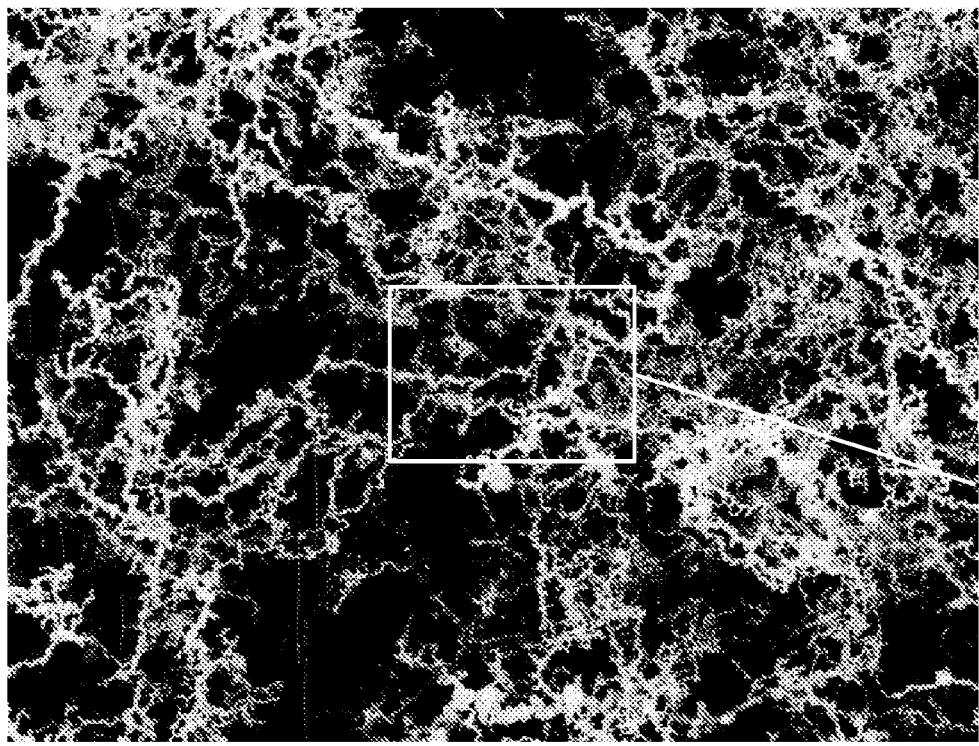
FIG. 3 is a microphotograph of free nickel branching nanostrands averaging about 100 nanometers in diameter and enlarged 2,500 times.
Figure 3A:
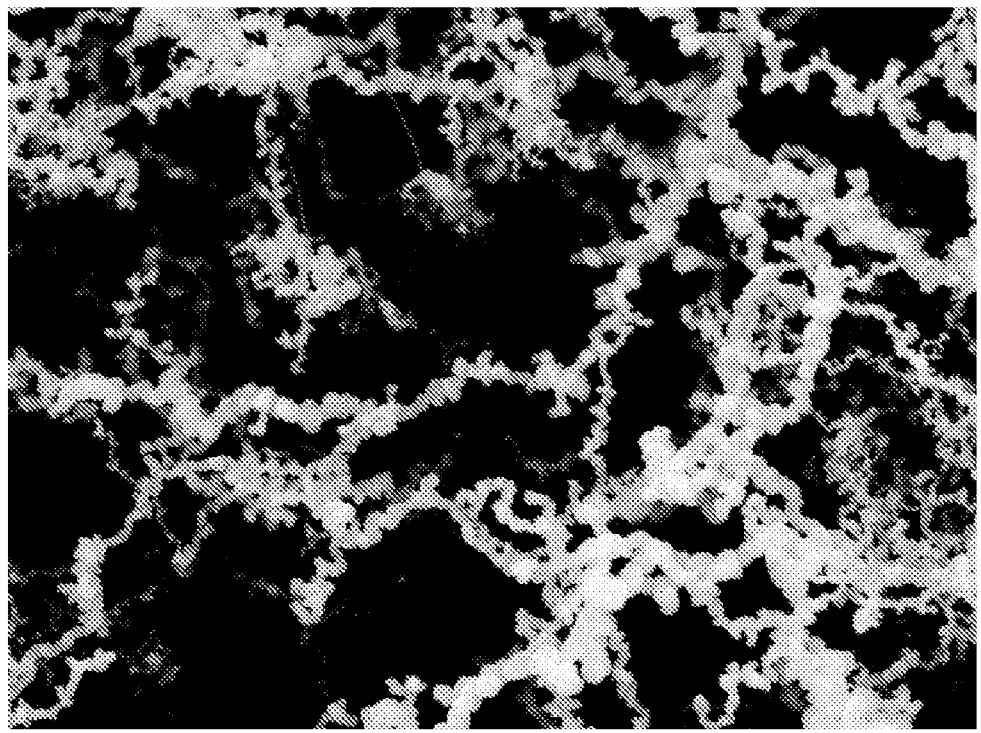
FIG. 3A is a microphotograph of the free nickel branching nanostrands of FIG. 3 enlarged 10,000 times.

FIG. 3 is a microphotograph of a batch of free nickel branching nanostrands that have been enlarged about 2,500 times. The nickel branching nanostrands of FIG. 3 have average diameters in a range of from about 75 nanometers to about 150 nanometers, which for ease of reference will be characterized as being of about 100 nanometers in diameter. The nickel branching nanostrands depicted range in length from about 30 microns to about 1000 microns. Associated therewith is the portion of FIG. 3 that is enclosed in a white rectangle, which has been enlarged four times and presented as FIG. 3A. It is to be noted that some portions of the 100-nanometer nickel branching nanostrands in these figures have large backbones possessed of diameters of about 200 nanometers and a significant number of side branches extending generally laterally therefrom having diameters in a range of from only about 50 nanometers to about 70 nanometers.

Figure 4:
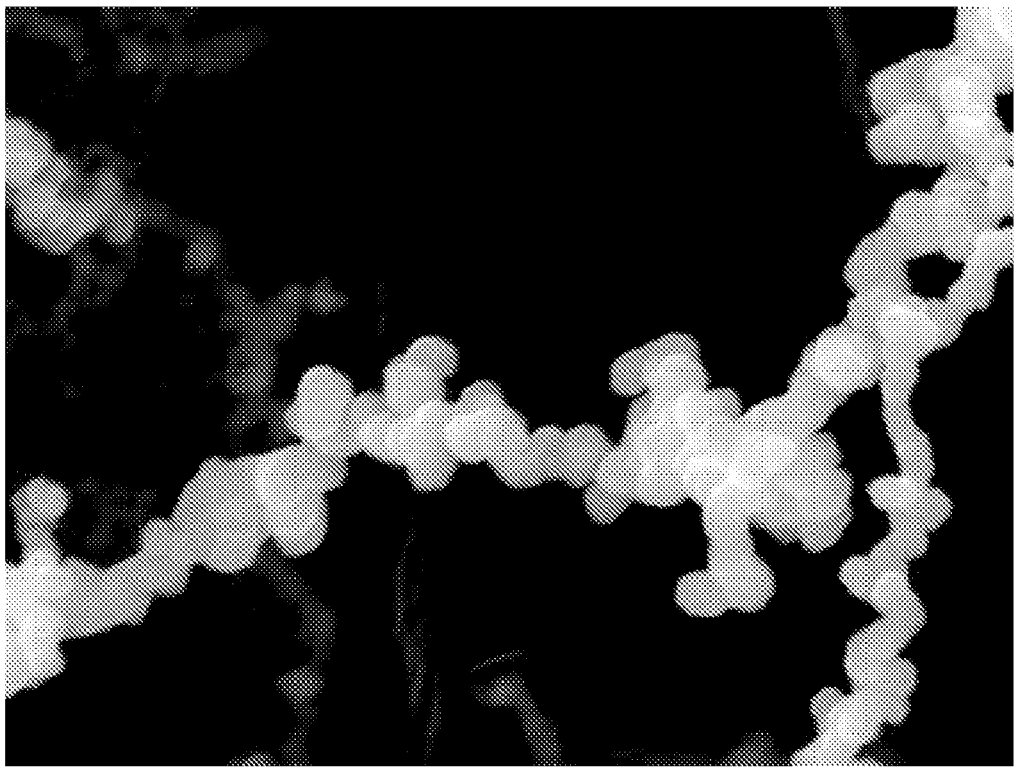
FIG. 4 is a microphotograph of free nickel branching nanostrands averaging about 70 nanometers in diameter and enlarged 40,000 times.

FIG. 4 illustrates that is possible to produce nickel branching nanostrands of even smaller average diameters than those of the nickel branching nanostrands of FIGS. 1-3A. There in another microphotograph, a batch of free nickel branching nanostrands is pictured in which the branching nanostrands have average diameters in a range of from about 50 nanometers to about 70 nanometers, which for ease of reference will be characterized as being about 70 nanometers in diameter.

Aspect Ratio Value: As discussed above the ARV of a structure is the ratio of the length of the structure to the width of the structure. Under customary production conditions, the lengths of nickel branching nanostrand appear to increase commensurately with the average diameter of the branching nanostrands, resulting in best cases in nickel branching nanostrand batches that display an ARV of 100:1.

Figure 5:
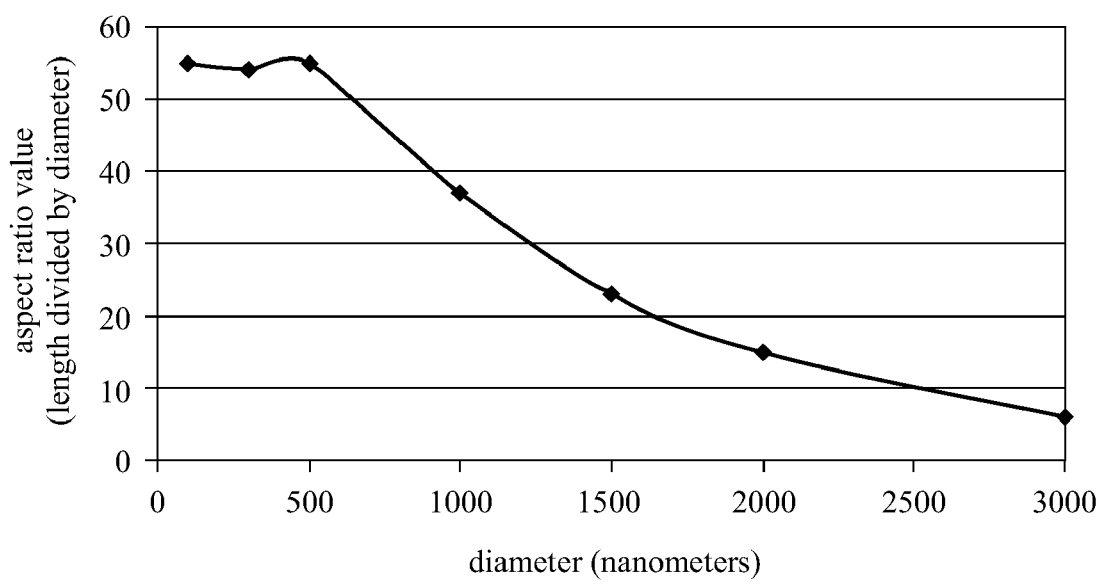
FIG. 5 is a graph depicting the relationship between diameter and aspect ratio value for nickel branching nanostrands created under routine production conditions.

The graph of FIG. 5 depicts the discovered relationship between the average diameter and the ARV of batches of nickel branching nanostrands. In the batches of nickel branching nanostrands having average diameters of up to about 1,000 nanometers, an ARV results in a range centered about 50:1 and extending from about 40:1 to about 60:1. By contrast, in the batches of nickel branching nanostrands having average diameters greater than about 1,000 nanometers, the ARV drops off considerably, until in batches of nickel branching nanostrands exhibiting average diameters of 3,000 nanometers an ARV is encountered that is less than the largest ARV mentioned above as being available in powdered forms of nickel.

It has been observed that the production of batches of nickel branching nanostrands in the presence of a magnetic field results in nickel branching nanostrands of remarkable lengths, in a range from about 10 microns to about 100 microns. Some of the nickel branching nanostrands produced in the presence of a magnetic field are several millimeters in length. The ARV of batches of nickel branching nanostrands produced in the presence of a magnetic field ranges upwardly to at least 250:1. Nickel branching nanostrands of such a high ARV are of particular utility as electrically-conductive additives, because it has been found that nickel branching nanostrands exhibiting a high ARV disproportionately enhance electrical conductivity when dispersed according to teachings of the present invention in a polymer resin.

Density: The density of free nickel branching nanostrands ranges generally from about 0.05 grams per cubic centimeter to about 0.10 grams per cubic centimeter. This equates to an open porosity of 99% or greater, meaning that a given volume of nickel when configured as nickel branching nanostrands forms an electrically-conductive lattice that fills a volume one hundred times that of the nickel in the lattice itself. A de minimus amount of metallic nickel is accordingly able, when in the form of branching nanostrands, to afford electrical conductivity to a quite significant volume of space, or to a quite significant volume of a polymer resin disposed in that space. Batches of nickel branching nanostrands possessed of a density of up to about 0.25 grams per cubic centimeter have been produced.

Electrical conductivity: Rough bulk conductivity measurements of free nickel branching nanostrands generally range from about 100 Siemens per centimeter to about 102 Siemens per centimeter. Batches of free nickel branching nanostrands exhibiting large average diameters and batches of free nickel branching nanostrands of high densities appear to be more electrically conductive, respectively, than batches of free nickel branching nanostrands exhibiting small average diameters and batches of free nickel branching nanostrands of low densities.

Nickel branching nanostrands are produced in batches that assume the form of light-weight, highly-porous cakes, biscuits, or bricks. The dramatic degree of porosity in nickel branching nanostrand cakes, biscuits, and bricks has already been discussed above in quantitative terms in relation to the density of free nickel branching nanostrands. Nickel branching nanostrand cakes, biscuits, and bricks are manufactured in various overall shapes. For example, nickel branching nanostrand cakes, biscuits, and bricks may assume a thin, planar configuration having the outward appearance of a sheet of paper, albeit a sheet of paper with an interior structure that is a highly porous lattice of electrically-conductive metal.

In use, an intact nickel branching nanostrand cake, biscuit, brick, or paper may function alone as an electrically-conductive preform. In some cases, the cake, biscuit, brick, or paper is deformed into the shape of a desired preform. Alternatively, the cake, biscuit, brick, or paper is carved, sliced, machined, or torn into the shape intended in a preform. Any of these forms of nickel branching nanostrand cakes, biscuits, bricks, or papers can be infused with a structurally-enhancing flowable matrix, such as a polymer resin, which then cures, sets, or cools into a rigid electrically-conductive composite article.

Where by contrast, nickel branching nanostrands are to be mixed as an electrically-conductive additive directly into such a matrix, cakes, biscuits, bricks, or papers of the nickel branching nanostrands must be rent apart to whatever degree facilitates the planned mixing methodology and to whatever degree is in harmony with the use intended for the composite article that eventually results when the matrix solidifies. Thus, a nickel branching nanostrand cake, biscuit, brick, or paper may be diced into fragments or systematically broken apart into even smaller particles. In the extreme, a nickel branching nanostrand cake, biscuit, brick, or paper may be screened into particles having overall dimensions of length that are comparable to the lengths mentioned earlier in nickel powders. On a microscopic scale, even screened nickel branching nanostrands retain in varying degrees some of the characteristics that make longer nickel branching nanostrands valuable as electrically-conductive additives.

Progressively more intense pulverization of cakes, biscuits, bricks, or papers of nickel branching nanostrands tends to degrade physical characteristics of nickel branching nanostrands, such as length or large ARV, that are, according to teachings of the present invention, to be optimized in nickel branching nanostrands employed as electrically-conductive additives in flowable polymer matrix systems.

Furthermore, it has been discovered that the properties of the flowable polymer matrix into which nickel branching nanostrands are added, as well as the manner in which that resulting suspension is manipulated prior to curing, setting, or cooling, also impacts, and routinely in an adverse manner, the desirable physical characteristics of nickel branching nanostrands that should, according to teachings of the present invention, be present in such additives when those additives have become fixed in a solidified polymer matrix.

Thus, according to one aspect of the present invention, nickel branching nanostrands of acceptable ARV are dispersed in a polymeric resin using only mixing methodologies that minimize shear in the suspension. As used herein the dispersion of nickel branching nanostrands in a flowable polymeric matrix in this recommended manner will be referred to as "minimal shear mixing". Examples of minimal shear mixing include simple mechanical stirring and doctor blading. Substantially equivalent more mechanically-sophisticated methods for effecting minimal shear mixing are equally workable. By using minimal shear mixing as described above, an optimum dispersion of nickel branching nanostrands is achieved throughout a flowable receiving matrix prior to the solidification of the matrix, and nickel branching nanostrands so dispersed will, for convenience herein, be referred to as "liberated branching nanostrands."

Minimal shear mixing must be conducted with an awareness of the curing, setting, or cooling time for the flowable polymer matrix involved. It has been observed, for example, that nickel branching nanostrands, while dispersing satisfactorily initially, may thereafter tend to clump back together and reconsolidate, if suspended in a low viscosity matrix or in one that fails to solidify within a reasonable interval. To overcome this phenomenon, a medium viscosity, quick set epoxy is used as the flowable polymeric matrix into which nickel branching nanostrand are added and dispersed using minimal shear mixing. This preserves the initial mechanical dispersion of the nickel branching nanostrands throughout the flowable matrix. Surfactants, dispersants, and adhesion promoters are used as needed, where not tending to produce effects that run counter to the maintenance of desirable physical characteristics in the nickel branching nanostrands in the matrix.

Views of composite materials produced through the minimal shear mixing of nickel branching nanostrands in a flowable matrix and the timely solidification of the matrix are presented in an accompanying series of microphotographs.

Figure 6:
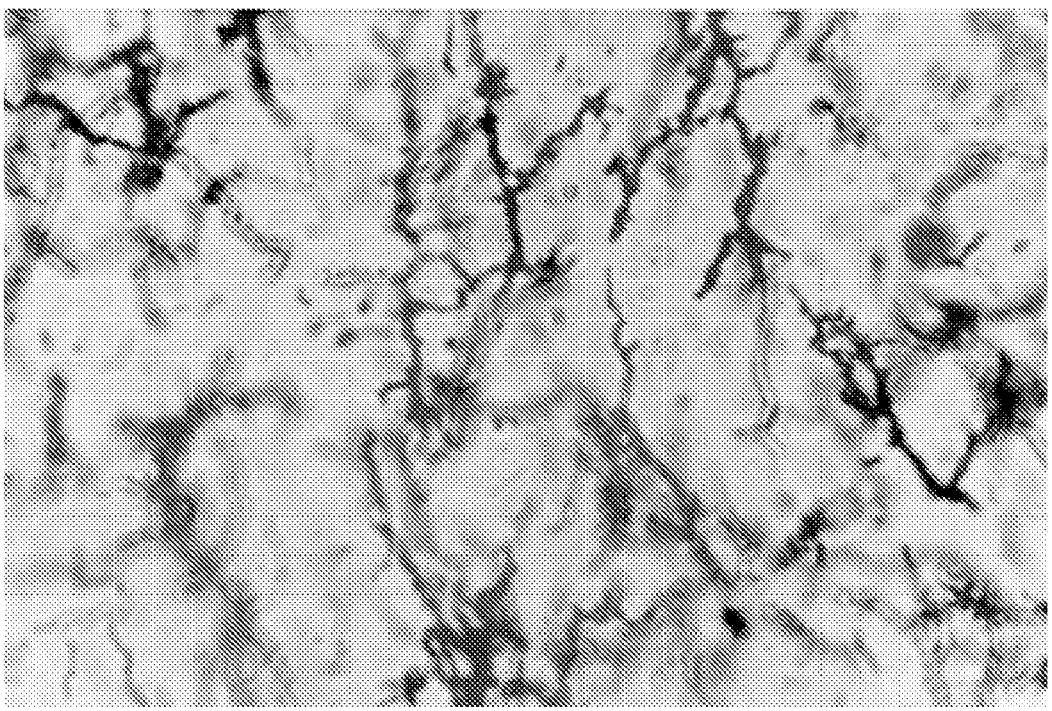
FIG. 6 is a microphotograph of nickel branching nanostrands averaging about 1000 nanometers in diameter dispersed at a 5% by-weight concentration with minimal shear mixing in an epoxy resin matrix and enlarged 1,000 times.

FIG. 6 is a microphotograph of nickel branching nanostrands averaging about 1000 nanometers in diameter that were dispersed at a 5% by-weight concentration with minimal shear mixing in an epoxy resin matrix that was cured in a timely fashion. The image has been enlarged 1,000 times. It can be observed that the nickel branching nanostrands fixed in the surrounding clear epoxy resin have retained substantial lengths, large aspect ratio values, and an abundant degree of lateral branching. The nickel branching nanostrands of FIG. 6 are consequently examples of liberated branching nanostrands. As a result, and as will be demonstrated by the presentation of actual test data subsequently, the composite system of FIG. 6 exhibits advantageously high degrees of electrical conductivity, or conversely advantageously low degrees of volume resistivity, and these properties recommend the composite system of FIG. 6 for uses contemplated by the present invention.

Figure 7:
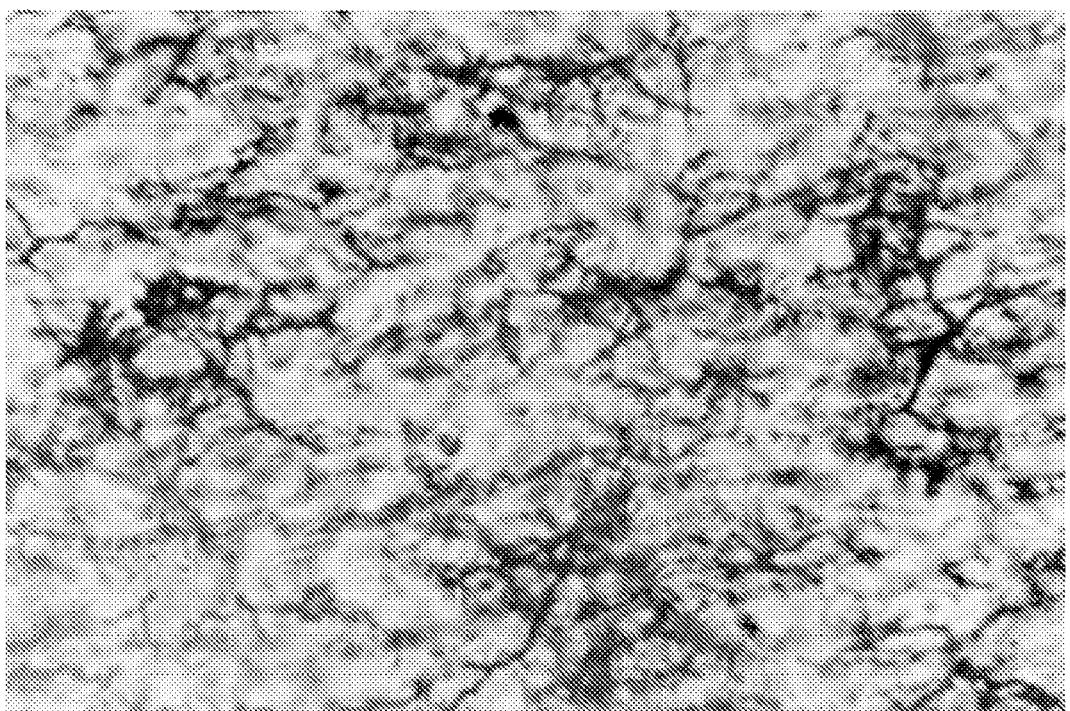
FIG. 7 is a microphotograph of nickel branching nanostrands averaging about 500 nanometers in diameter dispersed at a 5% by-weight concentration with minimal shear mixing in an epoxy resin matrix and enlarged 1,000 times.

FIG. 7 is a contrasting microphotograph of smaller nickel branching nanostrands, averaging about 500 nanometers in diameter, dispersed at a 5% by-weight concentration with minimal shear mixing in an epoxy resin matrix that was cured in a timely manner. For ease of comparison, as in FIG. 6, the image in FIG. 7 has been enlarged 1,000 times. A fine lattice of nickel branching nanostrands is observed to be fixed in the surrounding epoxy resin matrix, but the nickel branching nanostrands in that lattice are generally shorter than those in FIG. 6. Still, the lattice of nickel branching nanostrands fixed in the surrounding clear epoxy resin have retained substantial lengths, large aspect ratio values, and an abundant degree of lateral branching. The nickel branching nanostrands of FIG. 7 are consequently examples of liberated branching nanostrands.

Figure 8:
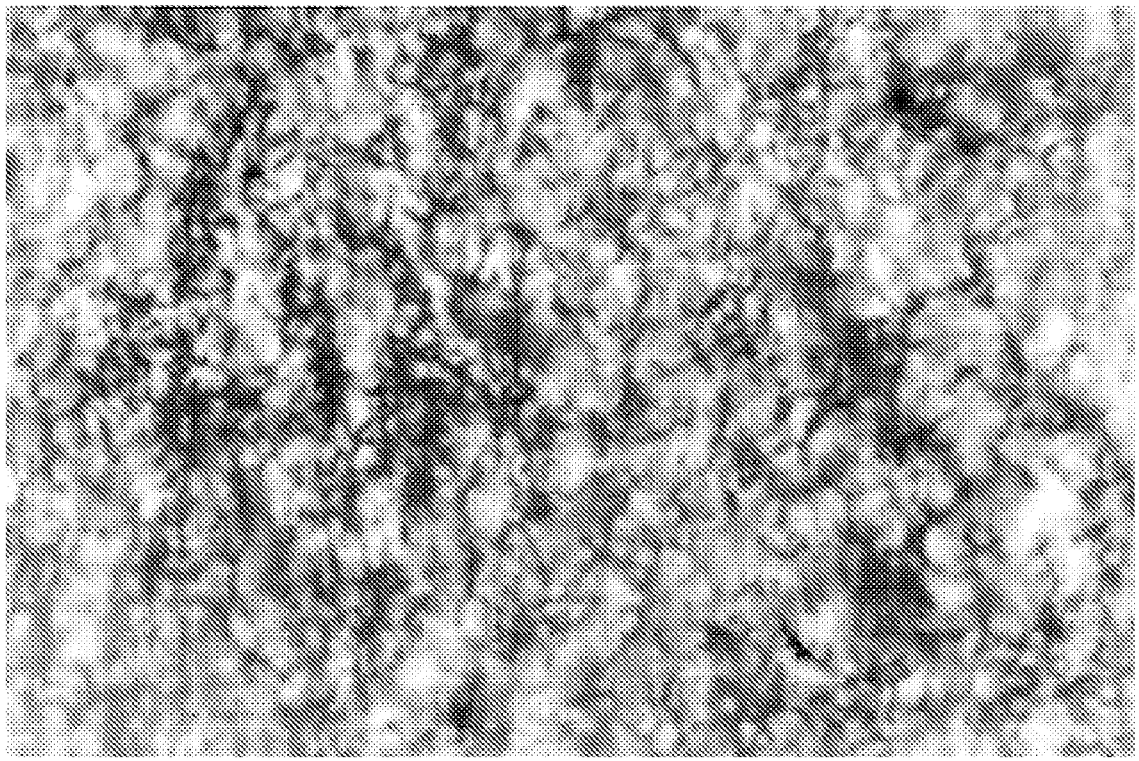
FIG. 8 is a microphotograph of nickel branching nanostrands averaging about 100 nanometers in diameter at a 5% by-weight concentration dispersed with minimal shear mixing in an epoxy resin matrix and enlarged 1,000 times.

Finally in FIG. 8, enlarged 1,000 times, are nickel branching nanostrands averaging about 100 nanometers in diameter fixed in a 5% by-weight concentration in a solidified epoxy resin matrix. The nickel branching nanostrands were dispersed with minimal shear mixing in the epoxy resin matrix, which was solidified with sufficient promptness to preclude reconsolidation of the nickel branching nanostrands. The lattice of nickel branching nanostrands in FIG. 8 appears as a fuzz in which discernable individual nickel branching nanostrand seem less robust and shorter than the nickel branching nanostrands in FIGS. 6 and 7. The nickel branching nanostrands fixed in the surrounding clear epoxy resin in FIG. 8 have, however, retained reasonably substantial lengths, reasonably large aspect ratio values, and an abundant degree of lateral branching. Consequently, the nickel branching nanostrands of FIG. 8 are examples of liberated branching nanostrands.

According to the teaching presented above, nickel branching nanostrands are added to thermoset and to thermoplastic polymer resin matrixes to successfully increase the electrical conductivity of the resulting composite material. Small quantities of nickel branching nanostrand additives of sufficient average diameter and corresponding length create conductivities of about $10^6$ ohm-centimeter or less, which is adequate for the purpose of electrostatic dissipation. Larger quantities of nickel branching nanostrand additives of sufficient average diameter and corresponding length create conductivities in a range of about of $10^1$ ohm-centimeter to about $10^{-1}$ ohm-centimeter, which is adequate for more robust electronics applications involving either higher currents or electromagnetic shielding.

Nickel branching nanostrands compare in effectiveness quite favorably with other electrically-conductive additives to polymer systems. Mixtures of type 210 Inco nickel powder in epoxy resin and nickel branching nanostrands in epoxy resin were formulated at a variety of weight percent loadings. The type 210 Inco nickel powder dispersed readily, and nickel branching nanostrand were also found to disperse quite quickly and evenly, particularly with minimal shear mixing. In a comparative test, an about 6% by-weight concentration of the type 210 Inco nickel powder was required to achieve a predetermined electrical conductivity threshold, while in the same epoxy resin, only an about 1% by-weight concentration of nickel branching nanostrands was required to attain the same electrical conductivity threshold.

Different ASTM methods of electrical testing have been employed to prove out the inventive technology.

The most common method, the ASTM 257 test method, uses a 2.54 centimeter long test bar of material having a 0.17-centimeter by 0.17-centimeter transverse cross section. This is a preferred test for measuring the bulk electrical conductivity, or inversely the volume resistivity, of a polymer-based electrically-conductive composite material. Testing is performed at specified points along the length of the test bar. The construction of the test bar consumes a relatively large amount of electrically-conductive additive.

The second method, the ASTM 2793 test method, determines the volume resistivity of adhesives. In this test method, a thin film of adhesive in a range of from about 0.025 centimeters to about 0.125 centimeters in thickness (i.e. about 0.010 inches to about 0.050 inches) is placed between a pair of opposed brass plates, which function as test leads. The electrical resistance between the pair of test leads is then measured. This method consumes relatively small absolute amounts of electrically-conductive additive, but the ASTM 2793 test method reports more favorable results at lower loadings than does the ASTM 257 test method. Presumably this is due to the shorter gauge length between the test leads employed in the ASTM 2793 test method as opposed to the distances between the specified contact points on the test bar used in the ASTM 257 test method.

FIG. 9 presents test results obtained using the ASTM 2793 test method from numerous samples of resin-based electrically-conductive composite material that included no surfactants, dispersants, or adhesion promoters. Thus, FIG. 9 illustrates the role of volume resistivity, the inverse of electrical conductivity, as a function of the diameters of the nickel branching nanostrands employed as electrically-conductive additives in the composite material. In all save one of the sample composite materials for which data is presented in FIG. 9, nickel branching nanostrands are the primary, or in other words the only, electrical conductors in the sample composite material. By way of perspective, a baseline sample electrically-conductive composite material employed only type Inco 255 nickel powder.

The graph of FIG. 9 indicates that the small-diameter nickel branching nanostrands are relatively poor electrically-conductive additives, when compared to large-diameter counterparts. As the diameter of the nickel branching nanostrands employed in the samples increases from 100 nanometers to 1000 nanometers, the volume resistivity steadily decreases, at each given by-volume concentration of additive. It is also demonstrated by the data in FIG. 9 that the largest diameter 2000-nanometer nickel branching nanostrands do not perform as electrically-conductive additives quite as well as do 1000-nanometer nickel branching nanostrands. Finally, from FIG. 9 it can be appreciated that higher ARV nickel branching nanostrands of the type produced in a magnetic field outperform all other electrically-conductive additives that were used and tested.

The reason for this phenomenon may reside in the ductile nature of small-diameter nickel branching nanostrands, which are accordingly easily bent by the wetting, the surface tension, and the capillary action of any suspending resin. Small-diameter nickel branching nanostrands, by having the longest specific total length per unit weight, might be likely to make and remain in or nearly in mechanical contact during low shear mixing, or short nickel branching nanostrands may be readily susceptible to reconsolidation during the period before a suspending matrix can solidify.

In any case, large-diameter nickel branching nanostrands are stiffer than small-diameter nickel branching nanostrands. Thus, large-diameter nickel branching nanostrands should be more likely to remain in or nearly in mechanical contact during low shear mixing.

Surface chemistry plays a significant role in such resin-based electrically-conductive composite systems.

The ASTM 2793 test method was also used to examine various sample electrically-conductive composite materials to compare the effects of nickel branching nanostrands as electrically-conductive additives with the effects produced by other typical commercially-available electrically-conductive additives. Employed in this later role were Ketchenblack carbon black, quality nickel powder, and multi-walled 90% pure carbon nanotubes measuring about 20 nanometers in diameter and about 5 microns to about 20 microns in length. The results appear in FIG. 10. No surfactants were employed during minimal shear mixing. This may account for the fact that the results in all cases were less positive than expected based on the results reported in FIG. 9. Still, the fact that the nickel powder proved to be as poor as shown in FIG. 10 suggests that the use of a chemical surface agent specific to nickel may also improve the performance of any resin-based system that employs nickel branching nanostrands as an electrically-conductive additive.

Figure 10:
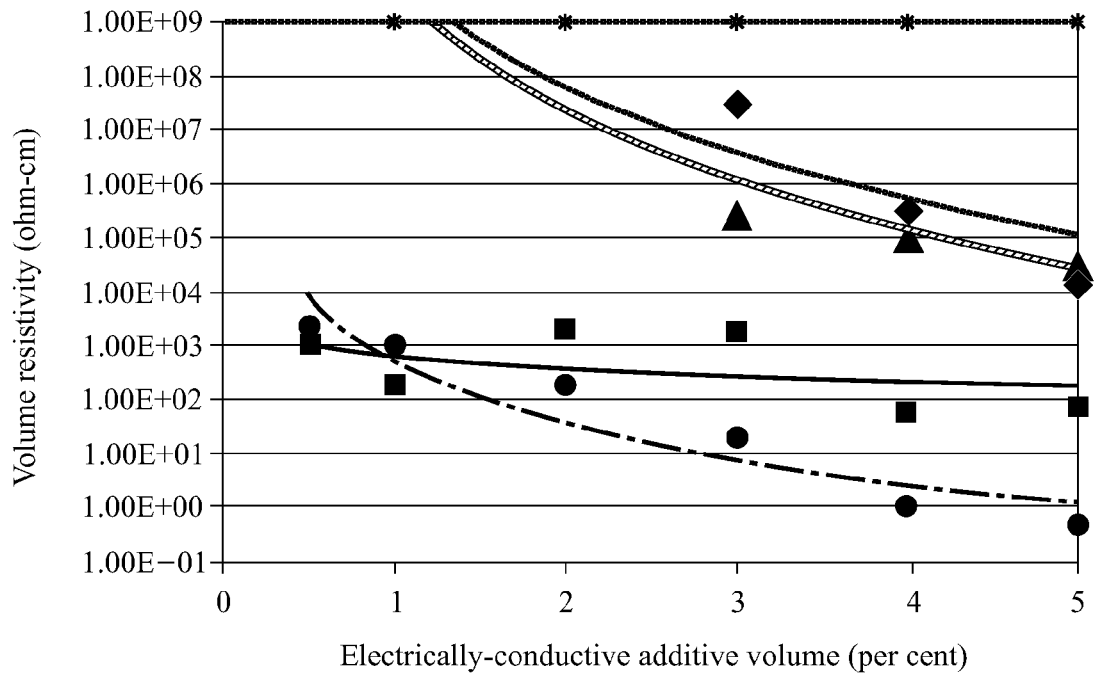
FIG. 10 is a graph presenting experimental data obtained from 0.03-inch thick adhesive films produced by distributing different electrically-conductive additives with minimal shear mixing in a quick-set epoxy resin matrix, the graph of FIG. 10 relating volume resistivity of the films to the volume concentrations of the electrically-conductive additive distributed therein.
Figure 11:
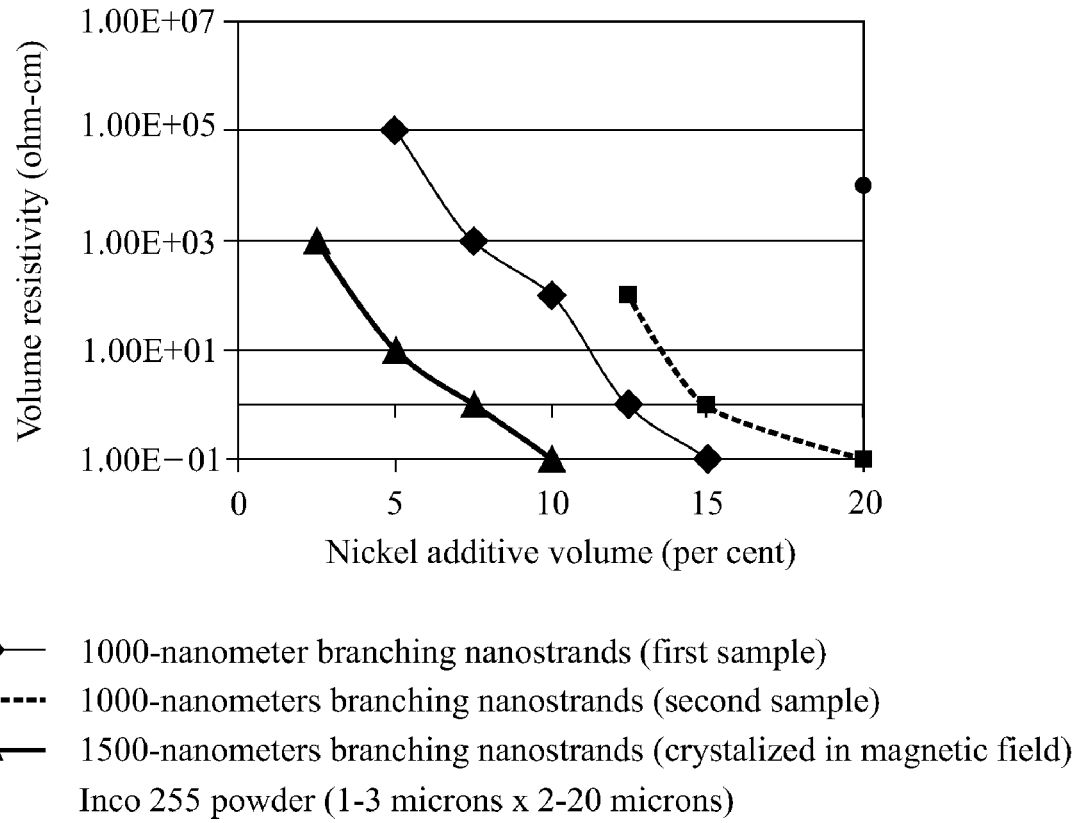
FIG. 11 is a graph presenting experimental data obtained from electrically-conductive bars produced by distributing different nickel additives with minimal shear mixing in an epoxy resin matrix, the graph of FIG. 11 relating volume resistivity of the bars to the volume concentrations of the nickel additive distributed therein.

Based on the results developed and presented in FIGS. 9 and 10, the 1000-nanometer nickel branching nanostrands and the 1500-nanometer nickel branching nanostrand crystallized in a magnetic field were chosen as electrically-conductive additives for comparison with quality nickel powder in bars used in a simulated ASTM 257 test method. Typical results appear in FIG. 11. Predictably, in the simulated ASTM 257 test method, higher additive loading levels were required to achieve levels of volume resistivity comparable to those obtained in the ASTM 2793 test method reported in FIGS. 9 and 10.

As demonstrated above, when distributed according to teachings of the present invention, nickel branching nanostrands are an advantageous electrically-conductive additive in the electrically nonconductive flowable matrix of a composite material. In such a role, the nickel branching nanostrands function as the primary electrical conductors in the resulting composite material.

Commonly, composite materials include a diverse range of additives, ranging from cosmetic coloring tints to functional mechanical reinforcements, such as fibers, papers, and scrims. These additives are combined with a flowable matrix that is then hardened into a composite material having desirable properties derived from those of the matrix and the additives in combination. The reinforcing additives may be entirely electrically nonconductive, as are most natural or polymer fibers; or the reinforcing additives may be slightly electrically-conductive, as in the case of aligned or chopped carbon fibers and carbon nanotubes. The electrical conductivity of reinforcing additives can be increased before the reinforcing additives are combined with the matrix of a composite system by coating the surfaces of the reinforcing additives with more highly electrically-conductive metals. Alternatively, reinforcing additives can be made entirely of metal. When electrically-conductive reinforcing additives become fixed in a surrounding matrix, the reinforcing additives themselves incorporate electrically-conductive pathways into the resulting composite system, becoming the primary electrical conductors therein.

Reinforcing additives are on average quite sizeable, usually by several orders of magnitude as, for example, compared to the sizes of nanostructured additives like nickel branching nanostrands. Absent other measures, the matrix in which such reinforcing additives become bound in a composite material, and correspondingly the volume of space separating individual reinforcing additives from each other in the composite material, is effectively electrically nonconductive. Consequently, according to another aspect of the present invention, metal, and particularly nickel, branching nanostrands are also employed in composite systems as secondary electrical conductors to intimately electrically interconnect primary electrical conductors through an intervening and otherwise electrically nonconductive matrix. As appreciated visually from FIGS. 6-8 above, and as demonstrated empirically in FIGS. 9-11 above, nickel branching nanostrands can impart to the binding matrix of such hybrid composite materials a secondary three-dimensional electrically-conductive network that supplements and refines the gross-level electrical conductivity contributed by reinforcing additives.

Views of hybrid electrically-conductive composite materials are presented in an accompanying pair of microphotographs.

FIG. 12 is a microphotograph of a hybrid composite material that includes chopped carbon fibers in an epoxy resin matrix into which were also distributed by minimal shear mixing nickel branching nanostrands. The nickel branching nanostrands provide secondary electrically-conductive pathways on an intimate scale within the epoxy resin matrix and between the chopped carbon fibers therein. The relatively linear structures shown are the chopped carbon fibers. Based on the scale key bar provided, these appear to have average diameters in a range from about 3 microns to about 5 microns. The sole chopped carbon fiber for which both ends are visible in FIG. 12 appears to have a length of about 150 microns. In stark scale contrast are the fuzz-like structures of the nickel branching nanostrands in the epoxy resin matrix between the chopped carbon fibers. The epoxy resin matrix is electrically nonconductive, but the nickel branching nanostrands suspended therein provide a three-dimensional electrically-conductive conductive network that extends intimately through the entire composite system.

It is expected that future modeling of hybrid composite materials will confirm and quantify the synergistic effect of adding nickel branching nanostrands as secondary conductors between nickel-coated continuous or chopped carbon fibers and large nickel-coated particles. Once the adhesion, dispersion, and additives science of nickel branching nanostrands in a composite polymer become understood, alternative hybrid electrically-conductive composite systems will be designed and produced that contain a light loading of very long, large-diameter nickel branching nanostrands electrically interconnected by a three-dimensional lattice of small-diameter nickel branching nanostrands.

In preparing the sample shown in FIG. 12, no dispersants or surfactants were employed. This permitted the nickel branching nanostrands to reconsolidate to a degree. It is significant to note, however, that the nickel branching nanostrands were, nonetheless, attracted to and gathered about the surfaces of the chopped carbon fibers, appearing as a dark corona surrounding the chopped carbon fibers. The nickel branching nanostrands extend the electromagnetic responsiveness of the chopped carbon fibers into the immediately surrounding epoxy resin matrix.

On this basis, it is theorized that, when reinforcing additives approach each other at distances smaller than the average lengths of nickel branching nanostrands also included in a hybrid composite system, different branches of individual nickel branching nanostrands are attracted to sites on different of the reinforcing additives.

This advantageous phenomenon is confirmed more clearly in FIG. 13, which is a microphotograph of a polished cross section of the surface of a hybrid electrically-conductive composite material prepared in accordance with teachings of the present invention. Shown in transverse cross section as dark discs are aligned carbon fibers. Based on the scale key bar provided, the carbon fibers appear to have average diameters of about 10 microns. Also included are nickel branching nanostrands distributed with minimal shear mixing in an embedding epoxy resin matrix at about a 3% by-volume concentration. Dark coronas of nickel branching nanostrands emanate from the sides of the carbon fibers, in many instances extend across the space between neighboring carbon fibers.

The electrical conductivity was measured for pairs of samples of electrically-conductive composite materials made under identical conditions containing the same reinforcing additives. The resin in one of each of the pairs of samples was enriched through the distribution using minimal shear mixing of a 3% by-weight concentration of nickel branching nanostrands, making the resulting one of each of the pairs a hybrid electrically-conductive composite material. The electrical conductivity of the hybrid sample in each pair was discovered to have tripled relative to the corresponding sample that lacked nickel branching nanostrands.

As a consequence, through the use of nickel branching nanostrands, less electrically-conductive additive is required to attain a desired degree of electrical conductivity in a composite material. This reduction in the needed loading of electrically-conductive additives conserves the cost associated with those additives and contributes to the preservation of desirable non-electrical properties, such as viscosity, in the constituent matrix material. In contrast to electrically-conductive polymer systems employing nickel branching nanostrands as electrically-conductive additives, the higher loading required to achieve commensurate degrees of electrical conductivity using type 210 Inco nickel powder causes a thickening of the polymer resin matrix into a paste-like consistency, even before the matrix solidifies.

The reduced loading required of nickel branching nanostrands when employed as electrically-conductive additives correspondingly permits color tints to be effective when added with nickel branching nanostrands to the resin of a composite material. In one example, a yellow tint was added to a composite system rendered electrically-conductive by the dispersion of nickel branching nanostrands. The resultant overall color of the composite material was a slightly-dulled yellow, while the electrical conductivity of the tinted composite material was unchanged from that of the untinted composite material. By contrast, the addition of the same relative amount of the same tint to a composite system made electrically-conductive with type 210 Inco nickel powder resulted in a dull brownish dark gray color in the resulting composite material.

The hybrid electrically-conductive composite materials disclosed above are useful in numerous technological disciplines.

For instance, in providing lightning strike protection for an aircraft part made of composite material, the addition of nickel branching nanostrands to the resin of the composite material results in the reinforcing carbon or nickel-coated carbon fibers in the composite material being electrically interconnected in all three orthogonal directions within the composite material, rather than being themselves the only electrically-conductive pathways through the composite material. To afford a three-dimensional electrically-conductive composite article an additional layer of electrical conductivity protection, the article can be coated with a primer containing nickel branching nanostrands.

It has been observed that nickel branching nanostrands will align longitudinally within a polymer matrix, if the polymer matrix bearing the nickel branching nanostrands is subjected to a magnetic field while still in a liquid or viscous condition. Corresponding variations arise in directional electrical conductivity when the polymer matrix subsequently solidifies.

Figure 14:
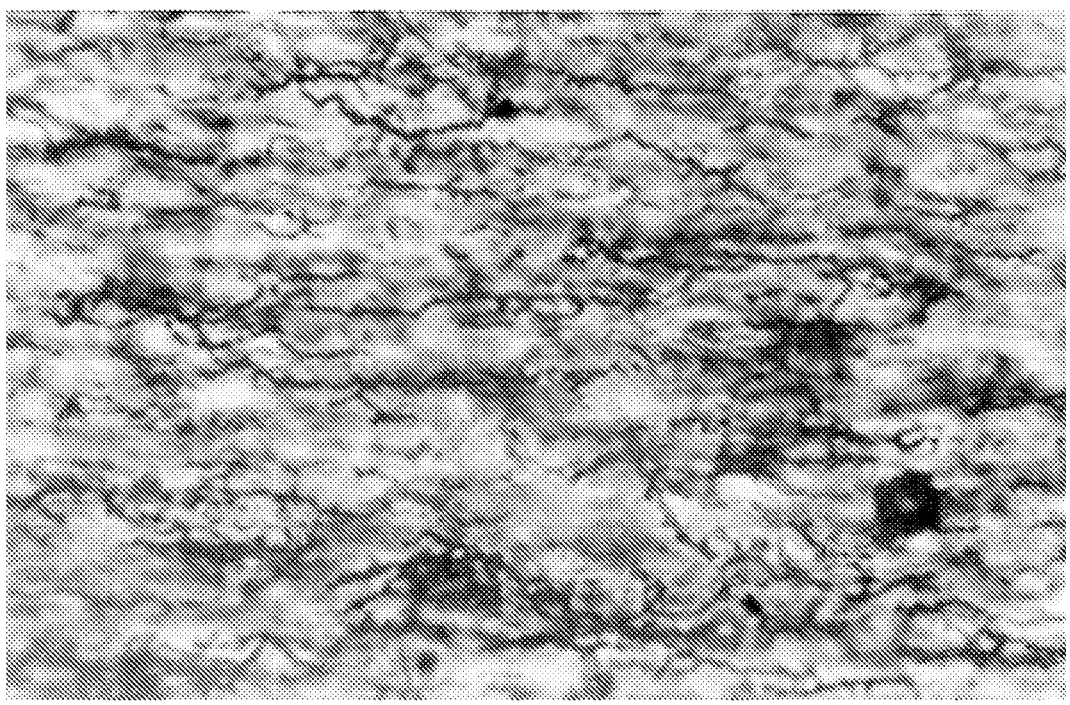
FIG. 14 is a microphotograph of a film of nickel branching nanostrands distributed with minimal shear mixing in an epoxy resin matrix and aligned magnetically before curing.

FIG. 14 is a microphotograph of a film of nickel branching nanostrands distributed with minimal shear mixing in an epoxy resin matrix and subjected to a magnetic field oriented in a left-right direction before the matrix solidified. The predominantly left-right orientation observable in the nickel branching nanostrands in FIG. 14 was initially magnetically induced while the suspending matrix was flowable, but the predominantly left-right orientation then became fixed when the matrix solidified. The electrical conductivity of the resulting composite material is greatest in the left-right direction.

When a polymer matrix suspension of nickel branching nanostrands dispersed by minimal shear mixing was subjected to the magnetic field of a standard bar magnet while the matrix was still in a viscous state, the amount of nickel branching nanostrands required to achieve electrical conductivity in the direction of the magnetic field dropped to only about 0.5%. Such magnetically-aligned dispersions were tested for conductivity against corresponding but non-aligned counterparts. It was found that samples of magnetically-aligned dispersions were twice as electrically-conductive in the direction of the alignment as were the non-aligned counterpart samples. The alignment of nickel branching nanostrands in a composite system enables the creation of electrically-conductive fibers, such as nylon fibers, for use in carpet, drapery, upholstery, clothing, and other textiles in which static build up is to be precluded.

In a similar manner, a magnetic field can be used to orient nickel branching nanostrands in a hybrid electrically-conductive composite material predominantly into a so-called Z-direction direction that is normal to the plane of the composite material. The orientation of the nickel branching nanostrands in the Z-direction complements and compensates for any predominantly X-directional or predominantly Y-directional mechanical orientational bias imparted to the fibers of the hybrid composite during manufacture.

With a sufficiently high loading of nickel branching nanostrands and an intense magnetic field, a threshold is reached at which the nickel branching nanostrands physically connect in a longitudinal direction to produce an elongated, continuous, metallic, electrically-conductive pathway. The resulting types of electrically-conductive composite materials can be used, for example, to create a nanostructured polarizer, or to produce polymer-based electrical circuit pathways capable of carrying substantial electrical currents through narrow spaces.

Various embodiments of selected aspect of the present invention will now be addressed in a streamlined, schematic manner relative to FIGS. 15-21.

Figure 15:
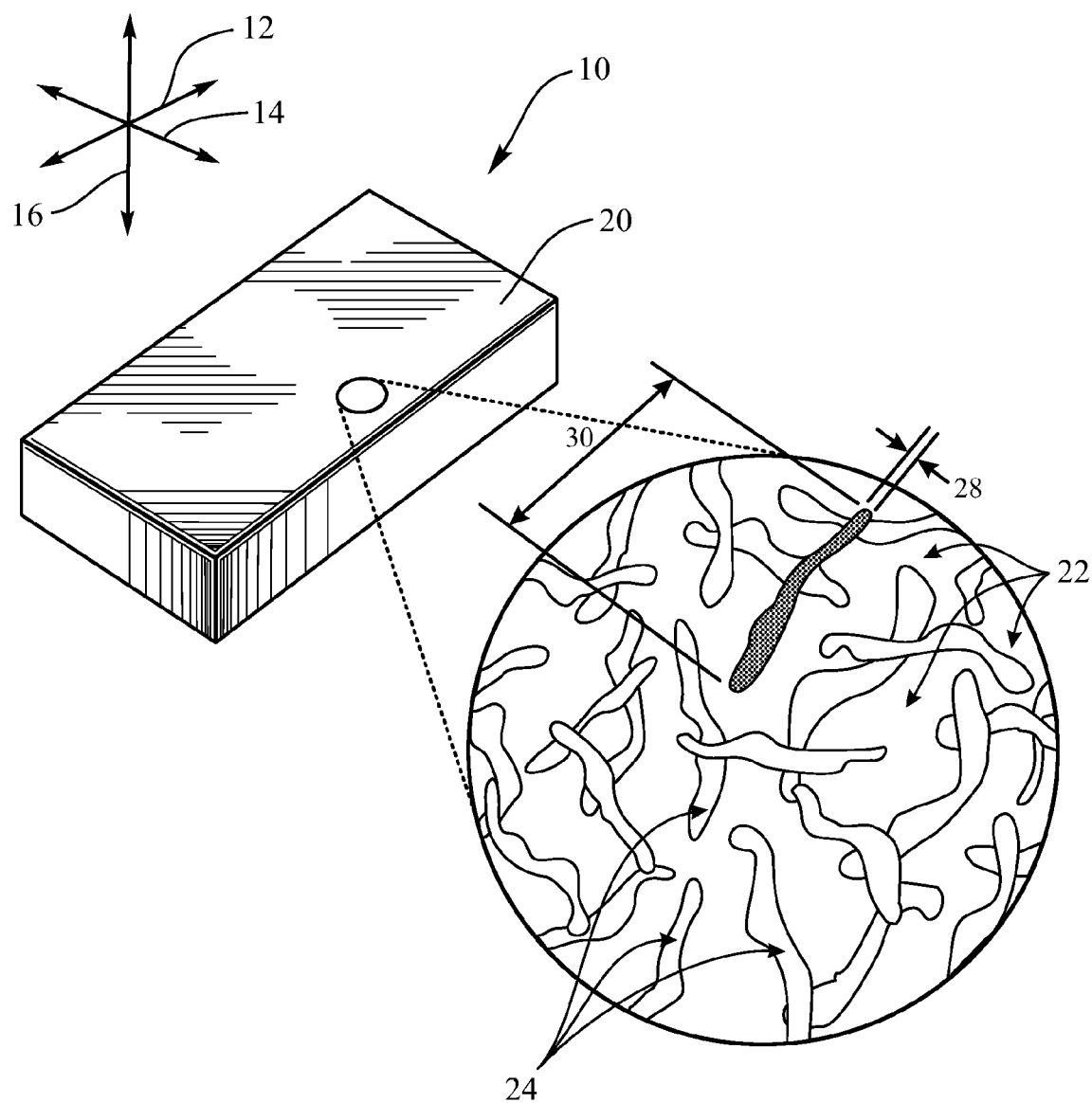
FIG. 15 is a perspective view of an article formed of a composite material according to one embodiment of the invention, with an enlarged inset illustrating schematically the branching nanostrands and the matrix of the composite material.

Referring to FIG. 15, a perspective view illustrates an article 10 with an arbitrarily selected rectangular shape. Of course, the article 10 can be formed into other shapes, but the rectangular shape has been selected for ease of illustration. The article 10 has a longitudinal direction 12, a lateral direction 14, and a transverse direction 16. The article 10 is constructed of a composite material 20. The composite material 20 provides a relatively high degree of electrical conductivity to enable current flow through the article 10 with comparatively low resistance.

As shown by the inset in FIG. 15, the composite material 20 has a nonmetallic matrix 22, or matrix 22, in which a plurality of metallic nanostrands 24 are distributed in a generally random orientation. As presented in FIG. 15, the nanostrands 24 appear as elongated structures lacking any lateral branches whatsoever, but it should be understood that this highly simplified and streamlined form of depicting the nanostrands 24 has been adopted for ease of illustration only. In actuality each of the nanostrands 24 in the inset of FIG. 15 or included in the composite material 20 of the article 10 is a complexly-branching structure of the type depicted, either as free branching nanostrands in FIGS. 1-4 above, or as branching nanostrands dispersed according to teachings of the present invention in an appropriate matrix in FIGS. 6-8 above.

The matrix 22 may be substantially formed of a nonmetallic material such as a polymer, ceramic, or elastomer. The matrix 22 may include various additives, or may be a combination of multiple materials. The following polymers have been tested and found to possess enhanced electrical conductivity when combined with metallic nanostrands: epoxy, acrylic, water based paints, urethanes, lacquers, silicone elastomers, and thermoplastics such as polyethylene. The matrix 22 is, however, not limited to these materials.

The metallic nanostrands 24, or nanostrands 24, are constructed of a metal such as nickel, iron, cobalt, chromium, molybdenum and other assorted metals. The metallic nanostrands 24 may be those of nickel disclosed in the Jenkin Patent, which includes examples that illustrate how the nanostrands 24 may be manufactured from nickel.

As shown, the nanostrands 24 have an average diameter 28 and an average length 30, indicated by the dimensions in the inset of FIG. 15 relative to a single of the nanostrands 24 that has, for convenience and enhanced clarity, been highlighted with stippling. The average diameter 28 and the average length 30 are shown on only the stippled one of the nanostrands 24, but both are nevertheless intended to represent average values for all of the nanostrands 24 taken collectively that are shown in the inset of FIG. 15 or included in the composite material 20 of the article 10. The nanostrands 24 also have an average aspect ratio value (hereinafter on occasion referred to as "the average ARV"), which may be defined as the average length 30 divided by the average diameter 28. The average ARV determined in this manner is thereby a concise numerical expression of the average length-to-diameter ratio of all of the nanostrands 24 in the article 10.

The nanostrands typically exhibit diameters 28 as small as twenty-five nanometers and as large as several microns, depending on the conditions of manufacture and the desired application. The average diameter 28 may range from about one tenth of a micron (one hundred nanometers) to about four microns. More specifically, for certain applications, the average diameter 28 may range from about one-half micron to about two microns. In certain embodiments, the average diameter 28 may be about one micron, if desired. Proper selection of the average diameter 28 may enhance the electrical conductivity of the composite material 20.

These metal nanostrands typically exhibit aspect ratios of at least twenty-to-one, and often between about fifty-to-one and about five-hundred to one. In some cases, aspect ratios of several thousand to one have been observed. Use of longer aspect ratios may enhance the electrical conductivity of the composite material 20, but longer aspect ratios also introduce practical limitations with respect to incorporating the nanostrands into an article. Nanostrands with an aspect ratio over about one-thousand-to-one are often difficult to disperse. Thus, the average aspect ratio may advantageously range from about ten-to-one to about one-thousand-to-one.

The unique nanostrand manufacturing process referred to in the Jenkin Patent allows nanostrands to be manufactured to almost any desired diameter and aspect ratio value. Otherwise, aspect ratio values of nanostrands, such as the nanostrands of the article 10 that are depicted in the inset in FIG. 15, that eventually are able to be embedded in a surrounding matrix are limited primarily by the type of process used to disperse those nanostrands into that matrix in the flowable condition thereof and to actually form the article 10. Many such manufacturing processes tend to sever the nanostrands, thereby reducing the aspect ratio values of the nanostrands contained in any resulting composite material. Articles may also be formed of chopped or screened nanostrands, producing nanostrands with a deliberately limited average length 30, and therefore a limited aspect ratio value as well.

Electrical conductivity may be provided by using comparatively low volumetric concentrations of the nanostrands 24. The volumetric concentration of nanostrands 24 (i.e., volume of the nanostrands 24 divided by the volume of the composite material 20) may range from about one-half of a percent to about twenty percent. Further, the volumetric concentration may range from about three percent to about twelve percent. Some factors that affect the needed volumetric concentration are the average diameter 28, the average aspect ratio, the degree of branching present in the nanostrands 24, and the surface chemistry, surface tension, and viscosity of the nanostrands 24 and the matrix 22.

More precisely, a comparatively large aspect ratio value may enhance the electrical conductivity of the composite material 20. Furthermore, a relatively high degree of branching of the nanostrands 24 is also helpful in providing high electrical conductivity. The branching may enhance the interconnection of the nanostrands 24, thereby providing more current pathways through the composite material 20. The degree of branching may be altered by changing the parameters used to form the nanostrands into biscuits, cakes, bricks, or paper thereof in the method of the Jenkin Patent. The dispersion techniques employed to liberate the nanostrands from a biscuit, cake, brick, or paper thereof, while preserving the appropriate degree of branching and the ARV that provide the high electrical conductivity of the composite herein described, involves using minimal shear mixing and choosing the right matrix viscosity, as already described above.

Electrical conductivity is also improved by adapting the viscosity of the matrix 22 and the surface tension of the interaction between the matrix 22 and the nanostrands 24, by comparison with the stiffness of the nanostrands 24. If the nanostrands 24 are not sufficiently stiff, they may be drawn apart from each other by the viscosity and surface tension effects of the matrix 22, thereby decreasing the electrical conductivity of the resulting composite material 20. The average diameter 28 may be optimized by providing an average diameter 28 just large enough to ensure that the stiffness of the nanostrands 24 is sufficient to resist these fluid and surface effects. Use of a larger diameter results in positioning of the nanostrands 24 further from each other (due to their size), thereby limiting the number of available conductive pathways.

Smaller diameter nanostrands 24 may also be used by applying additives to alter the viscosity or surface tension properties of the matrix 22 and/or the surface properties of the nanostrands 24. Surfactants may be used to wet the nanostrands 24, thereby decreasing the surface tension of the interface between the matrix 22 and the nanostrands. Furthermore, additives may be included in the matrix 22 to decrease the viscosity of the matrix.

As used herein, the term "metallic nanostrand" includes a variety of structures made wholly or mostly of one or more metals. The term "metal" excludes carbon because, although carbon may be considered a metal in some fields, carbon generally lacks the electrical conductivity to enable its efficient use in the present invention without the addition of a more conductive metal.

The composite material 20 may be made in a wide variety of ways, some of which will be set forth below in connection with FIGS. 20 and 21. According to one manufacturing method, the matrix 22 may be disposed in a viscous (i.e., flowable) form, and the nanostrands 24 are, according to teachings of the invention, dispersed with minimal shear mixing into the matrix 22. The matrix 22 with the nanostrands 24 thusly distributed therein may then be molded or otherwise disposed in a desired shape and permitted to cure to form the composite material 20. The polymer matrix may also be introduced by other techniques such as monomer in-situ polymerization and plasma polymerization.

If the matrix 22 is constructed of a ceramic material, known methods for ceramic matrix composite manufacturing may be applied. For example, chemical vapor deposition (CVD) techniques may be used in conjunction with, for example, carbides and/or silicon based materials to provide ceramic composites with the nanostrands 24.

In addition to electrical conductivity, the nanostrands 24 may provide additional properties such as mechanical strength and thermal conductivity. However, it may be desirable to further enhance such properties through the addition of larger fibers in conjunction with the nanostrands 24. This concept will be further shown and described in connection with FIG. 16.

Figure 16:
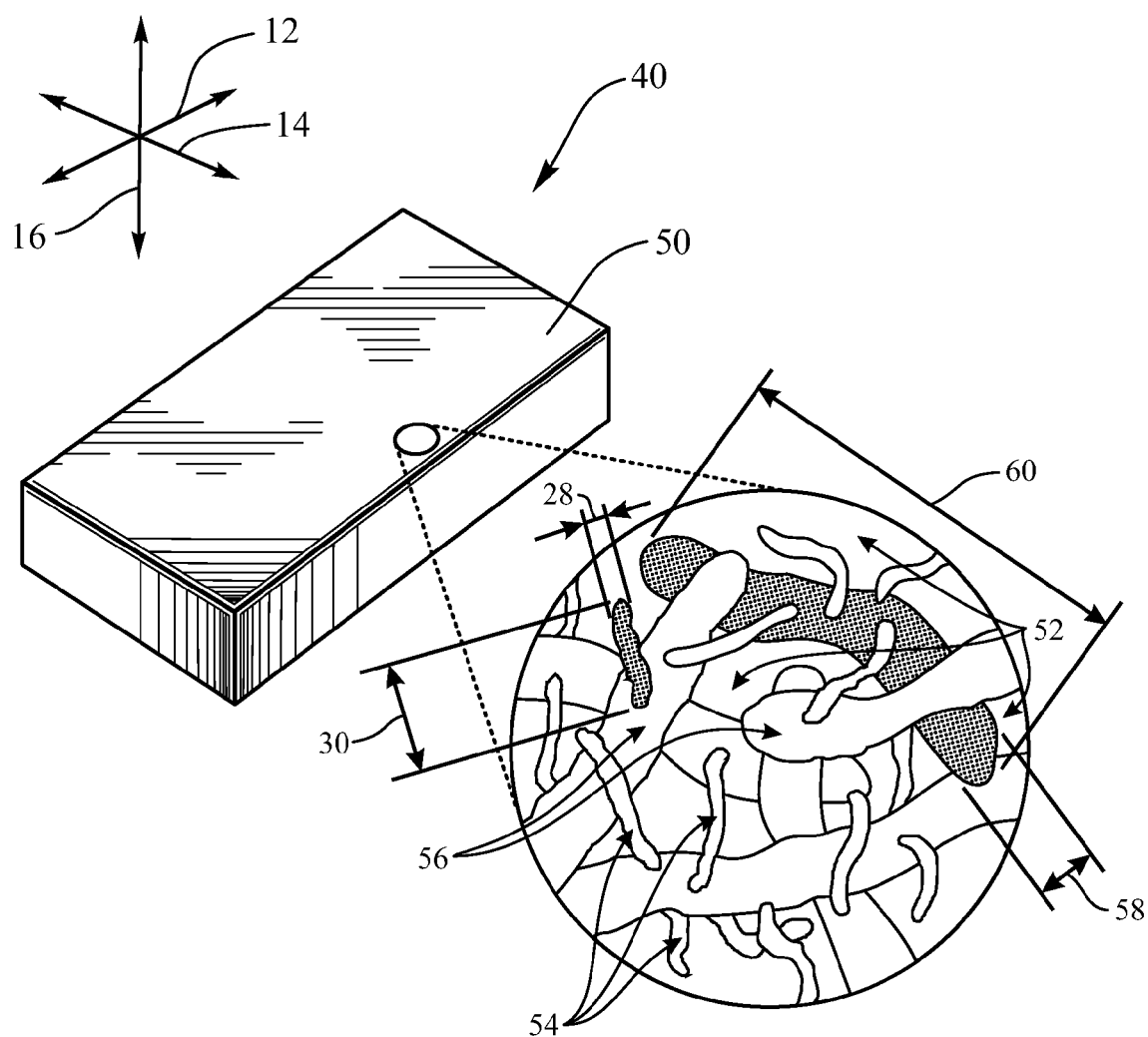
FIG. 16 is a perspective view of an article formed of a hybrid composite material according to one alternative embodiment of the invention, with an enlarged inset illustrating schematically the fibers, the branching nanostrands, and the matrix of the composite material.

Referring to FIG. 16, a perspective view illustrates an article 40 formed of a hybrid composite material 50 according to another embodiment of the invention in the manner of the hybrid composite materials seen in the microphotographs of FIGS. 12 and 13 above. As used herein, when applied to a composite system, such as the composite material 50, the expression "hybrid" is intended to refer to composite systems made from matrices in which are suspended comparatively large additives, such as continuous or chopped fibers, plain or metallically-enhanced carbon nanotubes, or electrically-conductive powders, that are in turn electrically-coupled by a finer lattice of small electrically-conductive structures, such as metallic branching nanostrands.

As shown in the inset in FIG. 16, the composite material 50 has a nonmetallic matrix 52, or matrix 52, in which a plurality of metallic nanostrands 54, or nanostrands 54, and a plurality of fibers 56 are disposed. As presented in FIG. 16, the nanostrands 54 appear as elongated structures lacking any lateral branches whatsoever, but it should be understood that this highly simplified and streamlined form of depicting the nanostrands 54 has been adopted for ease of illustration only. In actuality each of the nanostrands 54 in the inset of FIG. 16 or included in the composite material 50 of the article 40 is a complexly-branching structure of the type depicted, either as free branching nanostrands in FIGS. 1-4 above, or as branching nanostrands dispersed according to teachings of the present invention in an appropriate matrix in FIGS. 6-8 above.

The nanostrands 54 have an average diameter 28 and average length 30 set forth in the inset of FIG. 16 relative to a single of the nanostrands 54 that has, for convenience and enhanced clarity, been highlighted with stippling. The average diameter 28 and the average length 30 have been earlier described in conjunction with FIG. 15. Furthermore, the fibers 56 have an average diameter 58 and an average length 60, each of which is also set forth in the inset of FIG. 16 relative to a single of the fibers 56 that has, for convenience and enhanced clarity, been highlighted with stippling. The average diameter 58 of the fibers 56 is much larger than the average diameter 28 of the nanostrands 54. Furthermore, the average length 60 of the fibers 56 may be much larger than the average length 30 of the nanostrands 54.

The nanostrands 54 may be configured in a manner similar to the nanostrands 24 of FIG. 15. Alternatively, the nanostrands 54 may be adapted to cooperate with the fibers 56. The nanostrands 54 are distributed about and between the fibers 56 in such a manner that the nanostrands 54 bridge the gaps between the fibers 56 to facilitate conveyance of electric current through the composite material 50. If these gaps are short, the nanostrands 54 may have comparatively small diameters, because surface tension and viscosity effects are less significant when the nanostrands 54 are simply bridging a short distance. Accordingly, the average diameter 58 of the fibers 56 may be comparatively small, for example, on the order of fifty nanometers.

The fibers 56 may be constructed of a plurality of electrically-conductive materials, such as nickel, iron, cobalt, chromium, molybdenum, and other metals. Alternatively, the fibers 56 may be made of a metal coated carbon fiber or the like. The fibers 56 may also take the form of platelets or commercial powders of the types included among the additives dispersed in matrixes, studied, and reported in the data in the graphs of FIGS. 9-11 above. The fibers 56 and the nanostrands 54 may cooperate to synergistically improve the electrical conductivity of the composite material 50. As used herein relative to a hybrid composite system, the expression "synergistic improvement" is intended to refer to a combination of additives to a matrix that provides a higher electrical conductivity at a given volumetric concentration in that matrix than the electrical conductivity provided by the same volumetric concentration of either of the component additives alone.

For example, it has been observed that adding ten percent of a chopped metal-coated carbon fiber to a polymer matrix provided a volume resistivity of about one hundred ohm-cm. Using four percent of a particular nanostrand provided a similar volume resistivity. However, adding five percent of the chopped fiber and two percent of the nanostrands provided a volume resistivity of about ten ohm-cm, thereby providing a tenfold improvement. Using ten percent of the chopped fiber with four percent of the nanostrands yielded a volume resistivity of one ohm-cm or less, a one-hundred fold improvement. Thus, the nanostrands 54 and the fibers 56 interact synergistically to enhance the electrical conductivity of the composite material 50.

Similar effects may be obtained with continuous fiber composites. Such composites may already exhibit longitudinal conductivity in a direction parallel to the continuous fibers. However, nanostrands may be added either in a random orientation or in an orientation generally perpendicular to the continuous fibers to enhance the conductivity perpendicular to the fibers.

Due to such synergistic effects, the volumetric concentration of nanostrands included in the composite 50 may be much lower than that of the composite 20. For example, a two percent volumetric concentration of the nanostrands 54 may be quite sufficient to provide an enormous boost to the electrical conductivity of the composite material 50.

The fibers 56 may be selected simply for the purpose of optimizing electrical conductivity. Alternatively, the fibers 56 may be selected to provide other properties such as mechanical strength, rigidity, thermal conductivity, and the like. The fibers 56 may cooperate with the nanostrands 54 to provide enhanced electrical conductivity while being specifically selected to provide such other properties. Thus, selection of additives for enhancement of electrical conductivity may be at least partially decoupled from selection of additives for enhancement of such other properties. This enables separate selection of the desired volumetric concentrations of the nanostrands 54 and the fibers 56 to obtain the desired properties of the composite material 50.

The nanostrands 54 and the fibers 56 of FIG. 16 may be added to the matrix 22 in a manner similar to that described in connection with FIG. 15. If the fibers 56 are chopped fibers of the type illustrated in FIG. 12 above, they may be minimal-shear mixed into the matrix 22 along with the nanostrands 24. However, if the fibers 56 are continuous fibers of the type illustrated in FIG. 13 above, they may be impregnated with the matrix 22 after minimal shear mixing of the nanostrands 24 into the matrix 22.

Generally, in the case of a composite with continuous fibers, the nanostrands act primarily to create conductivity throughout the otherwise non conducting matrix and to act as dispersed electrical collectors and direct that electrical current to the fibers. The fibers act also somewhat as electrical collectors, but furthermore act as very long conductive paths to dissipate the current to other areas of, or out of, the composite.

The nanostrands 24 of the composite material 20 of FIG. 15, as well as the nanostrands 54 and the fibers 56 of the composite material 50 of FIG. 16, are generally random in orientation. Thus, electrical conductivity may be expected to be substantially equal in all directions. In some applications, it may be desirable to maximize electrical conductivity along one selected direction. One method for obtaining such directional electrical conductivity will be shown and described in connection with FIG. 17, as follows.

Figure 17:
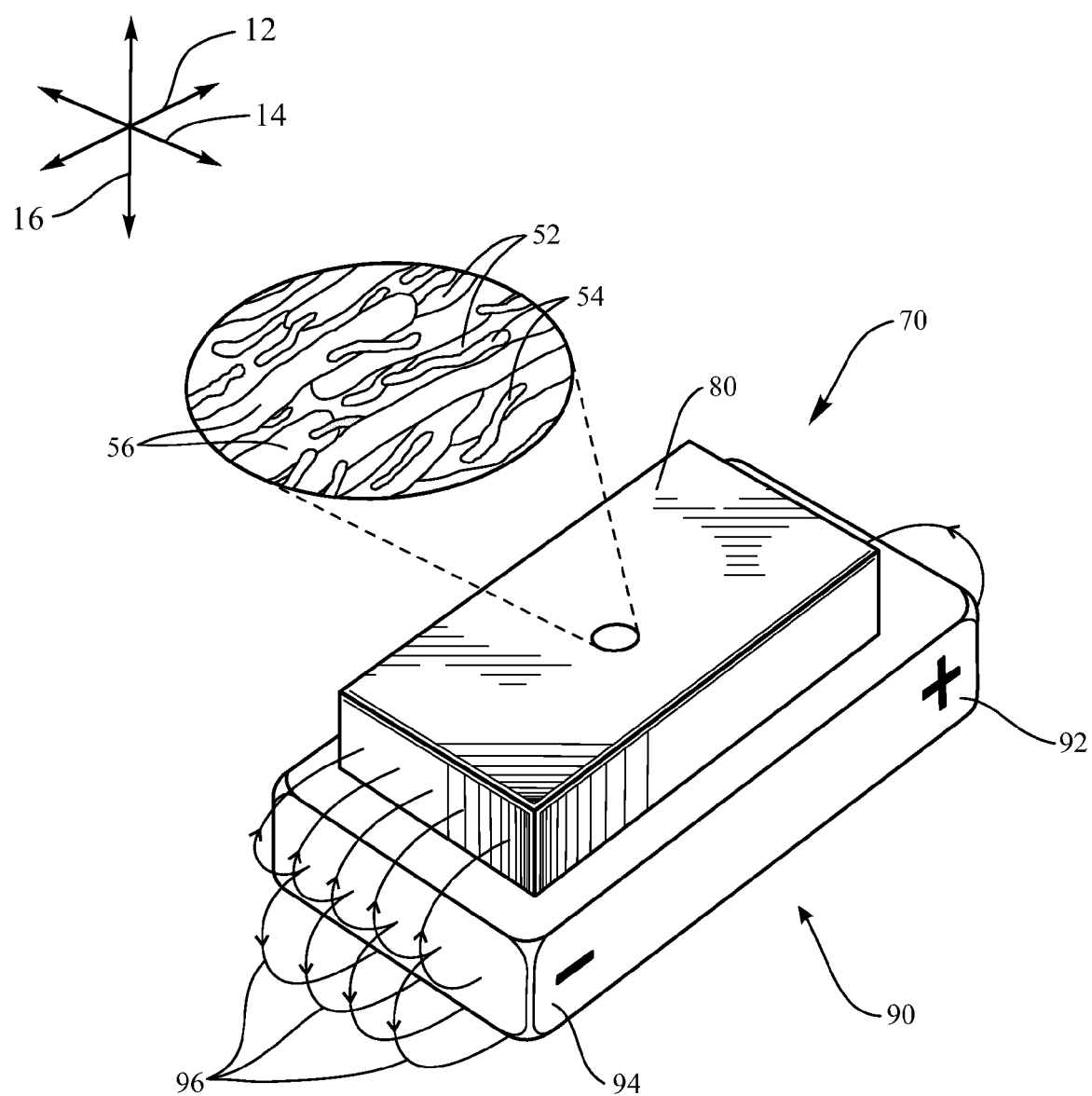
FIG. 17 is a perspective view of a composite material according to another alternative embodiment of the invention adjacent to a magnet that is being used to magnetically align the branching nanostrands and the fibers within the matrix of the composite material in the manner shown schematically in the accompanying enlarged inset.

Referring to FIG. 17, a perspective view illustrates an article 70 formed of a hybrid composite material 80 according to another alternative embodiment of the invention in the manner of the hybrid composite materials seen in the microphotographs of FIGS. 12 and 13 above. The composite material 80 may contain a nonmetallic matrix 52, a plurality of nanostrands 54, and a plurality of fibers 56 like those of the hybrid composite material 50 of FIG. 16. Prior to curing, setting, or cooling of the matrix 52, the nanostrands 54 and the fibers 56 may be exposed to magnetic flux in a manner such as that illustrated in FIG. 17.

More precisely, a magnet 90 may be disposed proximate the composite material 80 with the matrix 52 in the viscous phase. The magnet 90 may be a permanent magnet, an electromagnet, a superconductive electromagnet, or the like. The magnet 90 has a positive pole 92 and a negative pole 94, which are shown having a longitudinal orientation with respect to each other. The magnet 90 produces magnetic flux 96 that passes around the magnet 90 between the positive and negative poles 92, 94.

The magnet 90 is positioned adjacent to the composite material 80 such that a portion of the magnetic flux 96 passes through the composite material 80 in the longitudinal direction 12. The magnetic flux 96 causes the nanostrands 54 and the fibers 56 to rotate into general alignment with the longitudinal direction 12, as illustrated in the inset in FIG. 17. The nanostrands 54 bridge gaps between the fibers 56, as in the random orientation of FIG. 16. However, orientation of the nanostrands 54 and the fibers 56 in a common direction generally multiplies the number of electrical conduction pathways available to convey current in the longitudinal direction 12.

Thus, the electrical conductivity of the composite material 80 is greatly increased along the longitudinal direction 12, and commensurately reduced in the lateral and transverse directions 14, 16. However, in cases where the nanostrands 54 exhibit a lower aspect ratio and a higher amount of branching, the magnetic alignment will tend to "square up" the ordered branched structure and provide enhanced conductivity in all directions.

Consequently, magnetic orientation of nanostrands and/or fibers within a composite can be advantageous when it is desirable to obtain high electrical conductivity along a known direction. Such alignment of the magnetic material will also enhance the directional magnetic properties of the material by decreasing the material's magnetic reluctance. Such directional alignment may be useful for providing electrically or magnetically oriented ink for security purposes, screen printed circuitry, and the like. Magnetic alignment may even be reversibly applied to provide a digital memory module such as a magnetic data storage module, a sensor, a magnetically activated switch, or the like. Furthermore, the aligned magnetic nanostrands may act to polarize an electromagnetic wave, thus providing unique electro-magneto-optical properties.

The magnet 90 could easily be reoriented to align the nanostrands 54 and fibers 56 along the lateral direction 14 or the transverse direction 16, or along an oblique direction. Magnets with different polar configurations may alternatively be used to provide magnetic flux. If desired, an electromagnet (not shown) with a simple coil configuration may be disposed around the composite material 80. Upon activation, the coil produces magnetic flux through its center in a direction perpendicular to the coils, and thus, through the composite material 80.

The nanostrands 54 and the fibers 56 may be configured in a manner that provides relatively easy realignment. More specifically, the nanostrands 54 may have a certain minimum size, which is selected with reference to the viscosity and/or surface tension effects provided by the matrix 52. A more viscous matrix 52 that provides a higher resistance against motion of the nanostrands 54 requires the use of larger nanostrands 54 because more magnetic force is required to rotate the nanostrands 54. The strength of the magnet 90 may be increased to help overcome the viscosity and surface tension effects of the matrix 52. Longer fibers 56 and nanostrands 54 may also be more difficult to reorient than shorter ones, and may require compensation in terms of the strength of the magnet 90 or the viscosity and/or surface tension effects of the matrix 52.

These magnetic alignment effects may be applied to either nanostrands as a single additive, as for example, as depicted in the microphotograph in FIG. 14 above, or applied to the hybrid composite systems previously described that include a mixture of nanostrands and relatively larger continuous or discontinuous fibers. Hybrid composite systems are depicted, by way of example in the microphotographs in FIGS. 12 and 13 and are drawn in a schematic manner in the insets in FIGS. 15-17. The nanostrands 54 and the fibers 56 need not both be reoriented by the magnet 90. Rather, if desired, the size and aspect ratio of the nanostrands 54 and the length of the fibers 56 may be chosen in accordance with the chemistry, viscosity and surface tension of the matrix and the strength and direction of the magnetic fields to selectively orient (or not orient) only the nanostrands 54 or only the fibers 56.

For example, the nanostrands 54 may deliberately be made too small for realignment so that the nanostrands 54 remain generally randomly oriented. Alternatively, the fibers 56 may be constructed of a nonmagnetic material so that only the nanostrands 54 are reoriented. Furthermore, magnetic realignment may be practiced with a material like the composite material 20 of FIG. 15, in which only the nanostrands 24 are present. FIG. 17 illustrates the presence of the fibers 56 and nanostrands 54 simply by way of example.

As another alternative, magnetic realignment may be used to reorient nanostrands 54 disposed with fibers in a continuous fiber composite material. Although the continuous fibers (not shown) may not be reoriented, the nanostrands 54 can be magnetically oriented parallel to the continuous fibers to enhance electrical conductivity along the direction of the fibers. Alternatively, the nanostrands 54 may be magnetically oriented perpendicular to the continuous fibers to enhance electrical conductivity in directions nonparallel to the continuous fibers.

Some conductive composites according to the invention may provide variable electrical conductivity. Such composite materials may be used in sensors or other applications. One example of a sensor incorporating a composite material according to the invention will be shown and described in connection with FIG. 18.

Figure 18:
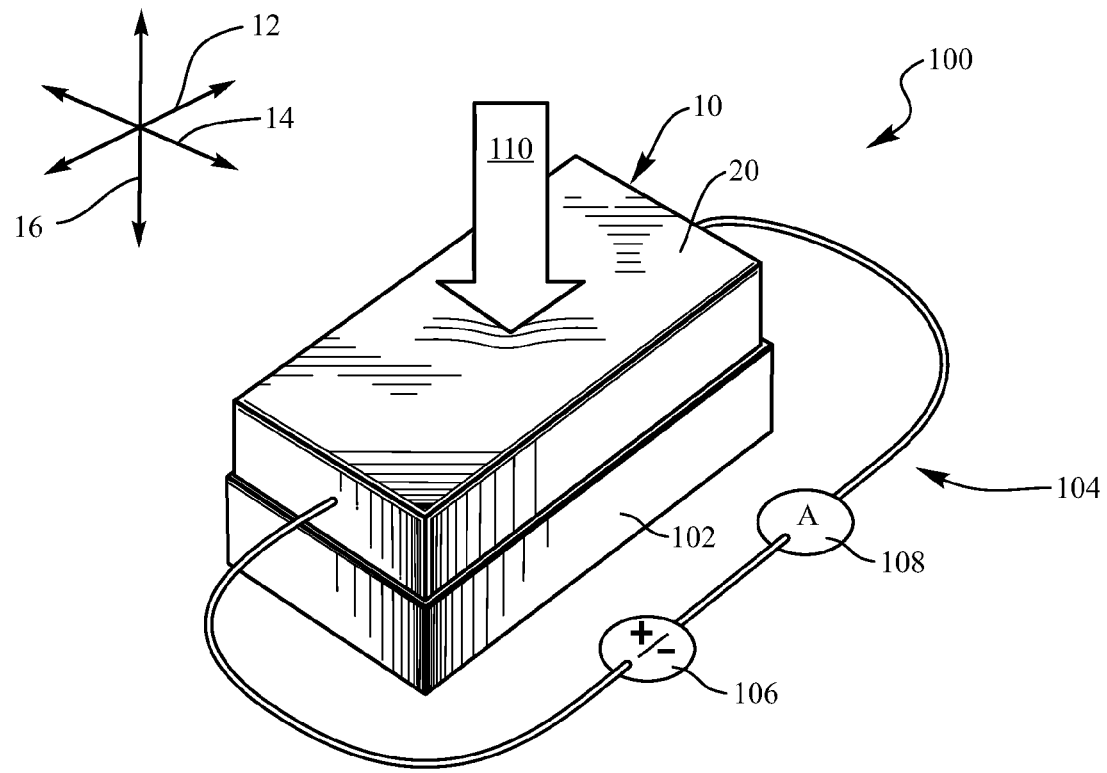
FIG. 18 is a perspective view of a pressure sensor incorporating a composite material according to another embodiment of the invention.

Referring to FIG. 18, a pressure sensor 100 is illustrated. As shown, the pressure sensor 100 includes the article 10 of FIG. 15, which is made of a composite material 20. The composite material 20 includes a matrix 22 and a plurality of nanostrands 24, as illustrated in FIG. 15. In the alternative, continuous or chopped fibers 56 may be included as in the composite material 50 of FIG. 16, and the nanostrands 22 individually or in addition to the fibers 56 may or may not be magnetically oriented in the manner indicated in FIG. 17.

The matrix 22 may be an elastomer such as silicone rubber. It has been found that, when disposed in an elastomeric matrix, the nanostrands 24 may provide an electrical conductivity that varies in proportion to deformation of the elastomer. More precisely, either tensile or compressive strain of the elastomer may tend to increase the electrical conductivity of the composite.

In one test, a silicone elastomer was loaded with an eight percent volumetric concentration of nanostrands to form a composite material. In an undeformed state, the volume resistivity of the composite structure was about fifty ohm-cm. When the composite structure was stretched to one-hundred and twenty percent of its original length or compressed to half its original thickness, the volume resistivity dropped to two-tenths of an ohm-cm. This principle may be used to enable use of metallic nanostrand-based composite materials in sensors.

In the implementation of FIG. 18, the article 10 is attached to a backing member 102, which may be constructed of a stiff, relatively nonconductive material. The article 10 is connected as part of an electric circuit 104 that includes a voltage source 106 and a current sensor 108 disposed in series with the voltage source 106 and the article 10.

When pressure is applied to the article 10 in the transverse direction 16, as indicated by the arrow 110, the article 10 is compressed transversely against the backing member 102. Simultaneously, the voltage source 106 induces electric current to flow through the article 10 in the longitudinal direction 12. As the article 10 is compressed, its electrical conductivity increases. Hence, the current flowing through the article 10 increases (assuming the voltage of the voltage source 106 is constant). The current sensor 108 reads the current during deformation.

Comparison of the current level under deformation with the current flowing through the article 10 in the undeformed state indicates the magnitude of the deformation. The magnitude of the deformation is proportional to the magnitude of the force indicated by the arrow 110. Thus, the pressure sensor 100 may act to measure a simple, point load, or a pressure distributed over the surface of the composite material 20. The pressure sensor 100 is simplified in form; other backing members, seals, and the like may be utilized to enhance the accuracy of the pressure sensor 100. If desired, such structures may be used to limit deformation of the composite material 20 to a single direction, such as the transverse direction 16.

Such a sensor may readily be used as a structural strain gage, an integral end effect tactile sensor for robotics or bionics, or the like. Furthermore, such a sensor may be adapted to measure a wide variety of electrical or magnetic properties as a function of mechanical forces in any direction. Such a sensor may be adapted to provide a temperature sensor by, for example, selecting a matrix 22 having a comparatively high coefficient of thermal expansion. The thermal expansion or contraction of the composite material 20 causes a corresponding change in the electrical conductivity of the composite material. The change in electrical conductivity can be measured in the manner indicated in FIG. 4 to measure the temperature change. In the alternative to elastomers, phase changing polymers or ceramics/slats may be possibly be used to provide the matrix 22.

Furthermore, such composite structures may potentially be adapted to change their size or shape as a function of applied electric current or magnetic fields. Thus, nanostrand-based composite materials may possibly be usable as muscles or motors as well as sensors.

In certain applications, it may be desirable to have an article that is generally formed of a nonconductive material, and to make that material conductive without altering the interior structure of the material. Such a procedure is useful in modifying existing equipment to provide conductive surfacing, as in the case of electromagnetic shielding. Furthermore, such a procedure is useful for articles that cannot reasonably be constructed of a solid composite material. One embodiment of a composite material that can be applied to a surface will be shown and described in connection with FIG. 19.

Figure 19:
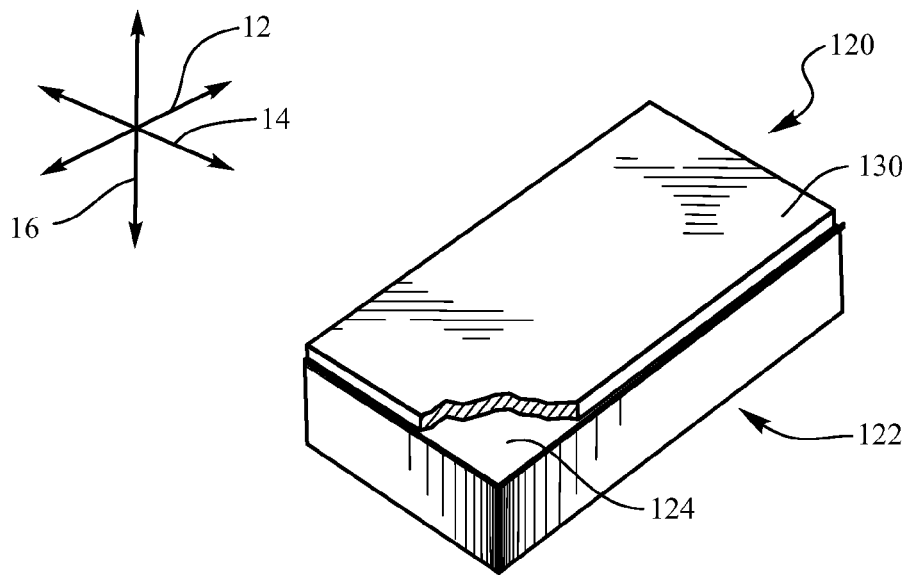
FIG. 19 is a perspective view of an article with a surface coated by an electrically conductive composite material according to the invention.

Referring to FIG. 19, a perspective view illustrates an article 120 to which composite materials according to the invention are applied to provide electrical conductivity. As shown, the article 120 includes a body 122 having a surface 124, the electrical conductivity of which is to be enhanced. An electrically conducive mixture 130 produced according to teachings of the invention has been applied to the surface 124 to enhance its electrical conductivity. The use of such an electrically conductive mixture 130 has a number of applications, including electro-static discharge, electromagnetic radiation shielding and absorption, lightning strike protection, and stun gun or microwave mitigation.

The electrically conductive mixture 130 is a composite material, which may be similar to any of the composite materials 20, 50, 80 disclosed in connection with FIGS. 15, 16, and 17, respectively. Hence, the electrically conductive mixture 130 has a matrix with nanostrands, with optional larger fibers and optional magnetic alignment or sensor capability of the nanostrands individually or in addition to the fibers. The matrix, nanostrands, and fibers have been illustrated in connection with previous embodiments, and hence are not shown in FIG. 19.

The matrix of the electrically conductive mixture 130 may advantageously be a polymer of a type commonly used for paints, such as an epoxy, acrylic, water based paint, urethane, or lacquers. The nanostrands, and optionally, larger fibers, may be mixed into the matrix in a viscous stage as described previously to form the electrically conductive mixture 130. The electrically conductive mixture 130 may then be applied to the surface 124 in a manner similar to that of ordinary paints. For example, the electrically conductive mixture 130 may be mechanically applied through the use of brushes, rollers, spray nozzles, or the like. Alternatively, the electrically conductive mixture 130 may be deposited via chemical or other methods.

A number of methods may be used to produce the composite materials of the present invention. Known methods for composite manufacture may be applied to nanostrand-based composites, as indicated previously. Other methods may alternatively be used to obtain conductivity enhancements or to facilitate manufacturing. Two exemplary manufacturing methods will be shown and described in connection with FIGS. 20 and 21, as follows.

Figures 20, 21:
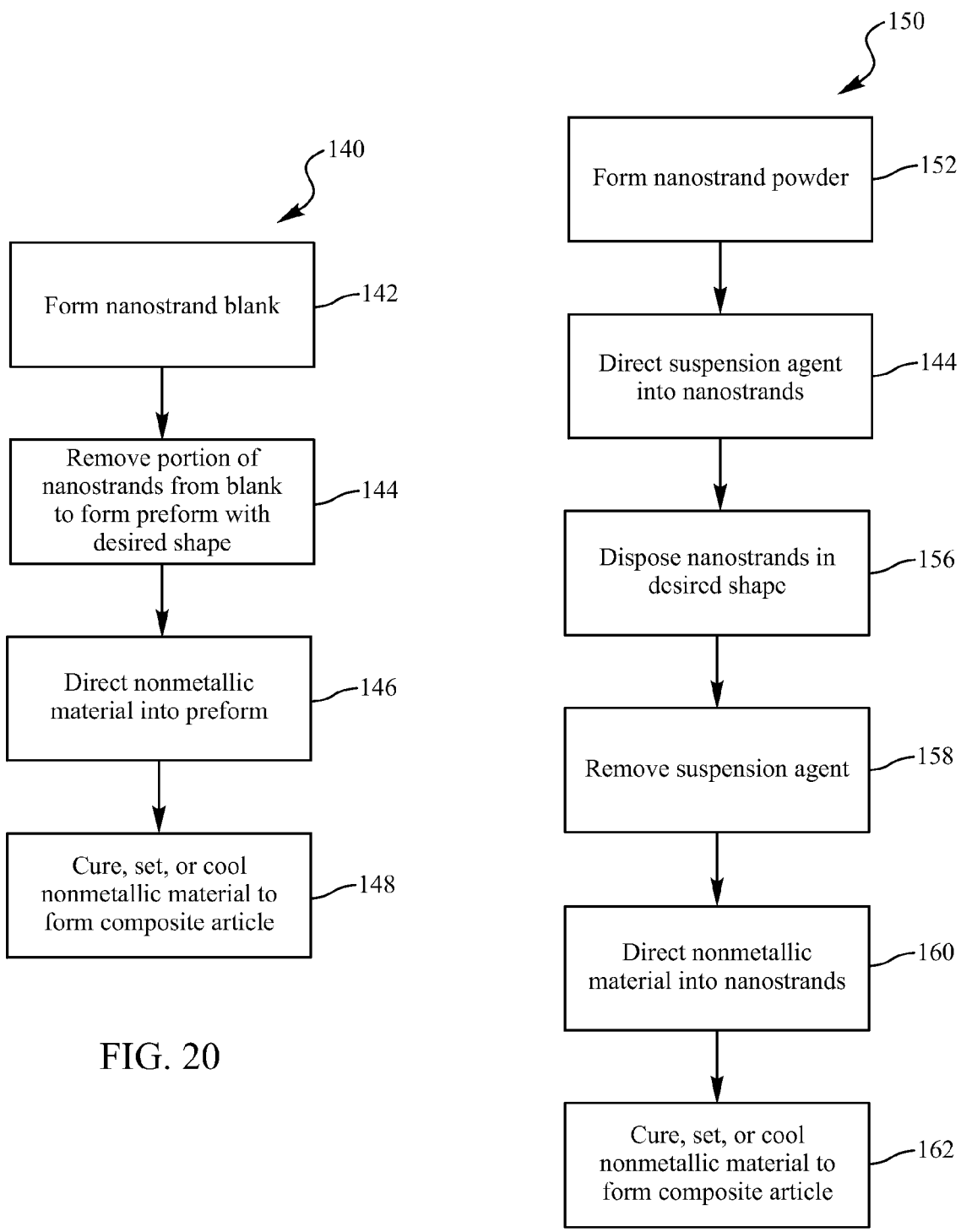
FIG. 20 is a flowchart diagram illustrating steps in one method of forming a composite article with a desired shape according to the invention.
FIG. 21 is a flowchart diagram illustrating steps in another method of forming a composite article with a desired shape according to the invention.

Referring to FIG. 20, a flowchart diagram illustrates a method 140 for manufacturing a composite article according to one embodiment of the invention. The method 140 may be used to manufacture a composite article with a certain desired shape.

According to the method 140, a nanostrand porous sponge, or "blank," is formed 142, for example, through the use of the methods described in U.S. Pat. No. 5,130,204. A "blank" is simply a volume of nanostrands having an arbitrary shape (i.e., the shape in which they were manufactured, which may be a sheet, a brick, a biscuit, or the like). A portion of the nanostrands are removed 144 from the blank to provide a preform with the desired shape of the composite product. A "preform" is a porous mass of interconnected nanostrands with a deliberately selected shape. Hence, unlike the blank, the preform has a shape that may be nonplanar (i.e., not sheet-like) and is not determined simply by the process used to form the nanostrands, although the nanostrands may be advantageously manufactured in a shape near that of the desired blank.

The blank may be mechanically cut, chemically removed, cut via lasers or electric discharge, or shaped in some other known manner to form the preform. Compaction of the blank may advantageously be avoided during removal of the portion of the nanostrands to maintain the porosity of the blank. The preform may then have a truly continuous three-dimensional lattice of nanostructured conductive material with a porosity in excess of ninety-nine percent. Some measured compaction may be used if a lower porosity is desirable, or if needed to achieve a particular finished complex geometry. Such a preform may be used without a matrix in applications such as filtering, catalysts, batteries, and gas absorption and/or storage.

Once the preform has been obtained, the nonmetallic material of the matrix is directed 146 into the preform. This may be accomplished by exposing the preform to the matrix material in the viscous phase, monomer phase, plasma phase or vapor phase. The matrix material may be pressurized and injected to facilitate relatively complete filling of the preform. The matrix is then allowed to cure, set or cool 148 to solidify the matrix, thereby forming the composite article with the desired shape. The composite material produced may have a structure similar to that of the composite material 20 of FIG. 15. The article may then be ready for direct application of subsequent final finishing or secondary molding to the desired shape.

According to alternative methods, larger fibers may be added into the blank during production of the nanostrands so that the blank is a lattice containing both the nanostrands and the larger fibers. Thus, the composite article will have the larger fibers, and may have a structure similar to that of the composite material 50 of FIG. 16.

Referring to FIG. 21, a flowchart diagram illustrates a method 150 for manufacturing a composite article according to another embodiment of the invention. Like the method 140, the method 150 may be used to manufacture a composite article with a certain desired shape.

According to the method 150, a nanostrand powder is first formed 152. This may be accomplished by forming the nanostrands initially as a powder, or by breaking up a nanostrand blank and screening the fragments to provide a powder. A solution of carrier fluid and suspension agent and surfactant (s) is then directed 154 into the nanostrands. Pretreatment of the nanostrands with appropriate surfactants may be advantageous. This nanostrand/fluid mixture is then disposed 156 in the desired shape, for example, by pouring the mixture into a mold of desired shape and size, with allowances made in the design for shrinkage.

The suspension agent helps to cause the nanostrands to adhere to one another. The suspension agent and the liquid may be removed 158 from the nanostrands via a process such as solvation or evaporation. Some of the suspension agent, or a related surfactant or adherent, may be permitted to remain in the nanostrands to maintain the attachment of the nanostrands to each other. Alternatively, slight thermal sintering may be applied to the nanostrands to keep the nanostrands attached together.

After the fluid and the suspension agent have been removed, the resulting structure is similar to the preform described above, in connection with the method 140 of FIG. 20. The nanostrands form a three-dimensional lattice having the desired shape. However, the resulting lattice may have a slightly lower porosity, which may range from about ninety-two percent to about ninety-seven percent.

The nonmetallic material of the matrix may then be directed 160 into the nanostrands in a manner similar to that described in connection with the previous embodiment. The matrix material may then be cured, set, or cooled 162 to form the composite article with the desired shape.

This method provides the advantage that any desired porous nanostrand shape can be created from a base material of bulk screened nanostrands. Thus, composite articles may be created with a larger variety of shapes and sizes. The screened nanostrands may also be easily shipped to a manufacturing site and used with little scrap.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A method for manufacturing a composite material capable of conducting electricity, the method comprising the steps of:
   (a) forming a plurality of metallic branching nanostrands having an average diameter less than about four microns and an average aspect ratio greater than about ten-to-one;
   (b) providing a plurality of fibers having an average diameter greater than about four microns;
   (c) distributing the fibers substantially throughout a matrix formed substantially of a nonmetallic material; and
   (d) dispersing the metal branching nanostrands substantially throughout the matrix as liberated metallic branching nanostrands by minimal shear mixing, the liberated metallic branching nanostrands retaining substantial lengths, large aspect ratios, and abundant lateral branching.

2. The method of claim 1, wherein the step of distributing the fibers in combination with the step of dispersing the metallic branching nanostrands by minimal shear mixing together result in a total volumetric concentration of the liberated metallic branching nanostrands and the fibers within the matrix sufficient to provide an electrical conductivity of the composite material that is at least ten times an electrical conductivity of the nonmetallic material alone.

3. The method of claim 1, wherein the step of dispersing the metallic branching nanostrands by minimal shear mixing is conducted using a volumetric concentration of the metallic branching nanostrands ranging from about one-half of a percent to about twenty percent of the volume of the matrix.

4. The method of claim 1, further comprising the step of selecting the fibers in such a manner that the fibers cooperate with the liberated metallic branching nanostrands to synergistically improve an electrical conductivity of the composite material.

5. The method of claim 1, further comprising selecting the fibers in such a manner that the fibers enhance a mechanical strength of the composite material.

6. The method of claim 1, wherein the step of forming the metallic branching nanostrands comprises the step of constructing the metallic branching nanostrands substantially of nickel.

7. The method of claim 1, wherein the matrix comprises a nonconductive material selected from the group consisting of elastomers and ceramics.

8. The method of claim 1, wherein the matrix comprises an elastomer, and wherein the step of dispersing the metallic branching nanostrands by minimal shear mixing produces an electrical conductivity of the composite material that varies generally in proportion to a magnitude of deformation of the elastomer.

9. The method of claim 1, further comprising the step of applying magnetic flux to the liberated metallic branching nanostrands and the matrix to orient the liberated metallic branching nanostrands generally parallel to each other and thereby enhance an electrical conductivity of the composite material along one direction.

10. The method of claim 9, further comprising the step of applying magnetic flux to orient the fibers generally parallel to the liberated metallic branching nanostrands.

11. The method of claim 1, wherein the step of dispersing the metallic branching nanostrands by minimal shear mixing produces an electrically conductive mixture capable of being applied to coat at least a portion of a surface of a body, the liberated metallic branching nanostrands in the electrically conductive mixture acting to convey electric current through the matrix to enhance the electrical conductivity of the surface of the body.

12. The method of claim 1, wherein forming the metallic branching nanostrands comprises utilizing a process selected to provide a comparatively high degree of branching of the metallic branching nanostrands.

13. The method of claim 1, further comprising applying a surfactant to the branching nanostrands to reduce surface tension of the matrix against the branching nanostrands.

14. The method of claim 1, further comprising applying an additive to the matrix to reduce a viscosity of the matrix.

15. The method of claim 1, further comprising disposing the matrix and the metallic branching nanostrands in a shape through which electricity is to be conducted.

16. The method of claim 15, wherein disposing the metallic branching nanostrands in a shape through which electricity is to be conducted comprises creating a preform of the metallic branching nanostrands, the preform having the shape, wherein distributing the metallic branching nanostrands substantially throughout the matrix comprises directing the nonmetallic material into the preform such that the nonmetallic material substantially fills interstices between the metallic branching nanostrands.

17. The method of claim 15, wherein disposing the metallic branching nanostrands in a shape through which electricity is to be conducted comprises:
   breaking up the metallic branching nanostrands by minimal shear mixing;
   performing the minimal shear mixing of the metallic branching nanostrands with a suspension agent such that the metallic branching nanostrands and the suspension agent receive the shape; and
   removing the suspension agent;

wherein distributing the metallic branching nanostrands substantially throughout the matrix comprises directing the nonmetallic material into the metallic branching nanostrands such that the nonmetallic material substantially fills in interstices between the metallic branching nanostrands.

18. The method of claim 1, further comprising curing the matrix.

19. A method for measuring deformation in an article made substantially of a nonconductive material, the method comprising the steps of:
  (a) forming a plurality of metallic branching nanostrands having an average diameter less than about four microns;
  (b) dispersing the metallic branching nanostrands by minimal shear mixing substantially throughout a matrix of the nonconductive material as liberated metallic branching nanostrands, the liberated metallic branching nanostrands dispersed by minimal shear mixing retaining substantial lengths, large aspect ratios, and abundant lateral branching, the step of dispersing by minimal shear mixing thereby producing a composite material comprising the liberated metallic branching nanostrands and the nonconductive material;
  (c) forming the composite material into an article;
  (d) causing deformation to the article to produce a deformed article, the deformation comprising at least one of the group of deformations consisting of tension and compression; and
  (e) measuring the electrical conductivity of the deformed article to determine a magnitude of the deformation thereof, the deformation of the article causing the electrical conductivity of the article to increase.

20. The method of claim 19, further comprising the steps of:
  (a) observing the electrical conductivity of the article prior to the step of causing deformation; and
  (b) determining the magnitude of the deformation by comparing the electrical conductivity in the deformed article with the electrical conductivity of the article prior to the step of causing deformation.

21. The method of claim 19, wherein the nonconductive material comprises an elastomer.

22. The method of claim 19, wherein the step of forming the metallic branching nanostrands comprises the step of constructing the metallic branching nanostrands substantially of nickel.

23. The method of claim 19, wherein the article formed from the composite material is a component of a pressure sensor.

24. The method of claim 19, wherein the article formed from the composite material is a component of a temperature sensor, the temperature sensor determining the temperature of the article by sensing thermal expansion and contraction of the composite material in the article.

* * * * *

UNITED STATES PATENT AND TRADEMARK OFFICE
CERTIFICATE OF CORRECTION

| | | |
|---|---|---|
| PATENT NO. | : 7,947,773 B2 | Page 1 of 1 |
| APPLICATION NO. | : 11/609113 | |
| DATED | : May 24, 2011 | |
| INVENTOR(S) | : George Clayton Hansen et al. | |

It is certified that error appears in the above-identified patent and that said Letters Patent is hereby corrected as shown below:

In column 27, claim 1, line 47, please replace "metal" with --metallic--

Signed and Sealed this
Twelfth Day of July, 2011

David J. Kappos
*Director of the United States Patent and Trademark Office*